United States Patent
Kumar et al.

(10) Patent No.: US 9,009,651 B2
(45) Date of Patent: Apr. 14, 2015

(54) SYSTEM AND METHOD FOR MANAGEMENT OF A PROGRAM THROUGHOUT ITS LIFECYCLE IN AN ORGANIZATION

(75) Inventors: Satyendra Kumar, Bangalore (IN); Amankumar Singhal, Bangalore (IN); Geetha Das, Bangalore (IN); Ganapathi Raman Balasubramanian, Mysore (IN); Hareshkumar Amre, Pune (IN); Ramarathinam Sellaratnam, Bangalore (IN); Sunita Kulkarni, Pune (IN); Vasudevan Sankaran, Bangalore (IN)

(73) Assignee: Infosys Limited (IN)

( * ) Notice: Subject to any disclaimer, the term of this patent is extended or adjusted under 35 U.S.C. 154(b) by 252 days.

(21) Appl. No.: 13/434,055

(22) Filed: Mar. 29, 2012

(65) Prior Publication Data
US 2012/0297358 A1    Nov. 22, 2012

(30) Foreign Application Priority Data
Mar. 30, 2011    (IN) .......................... 1030/CHE/2011

(51) Int. Cl.
| G06F 9/44 | (2006.01) |
| G06Q 10/06 | (2012.01) |
| G06Q 30/00 | (2012.01) |
| G06Q 40/00 | (2012.01) |

(52) U.S. Cl.
CPC  *G06Q 10/06* (2013.01); *G06F 8/10* (2013.01); *G06Q 30/01* (2013.01); *G06Q 40/00* (2013.01)

(58) Field of Classification Search
CPC .................................................... G06Q 30/01
USPC ........................................................ 717/102
See application file for complete search history.

(56) References Cited

U.S. PATENT DOCUMENTS

| 6,606,744 | B1 * | 8/2003 | Mikurak .................... 717/174 |
| 6,615,166 | B1 * | 9/2003 | Guheen et al. .................. 703/27 |
| 7,237,225 | B2 * | 6/2007 | Kompalli et al. ............. 717/108 |
| 8,069,435 | B1 * | 11/2011 | Lai ................................ 717/106 |
| 2007/0226678 | A1 * | 9/2007 | Li et al. ........................ 717/101 |
| 2008/0270205 | A1 * | 10/2008 | Kumar et al. ...................... 705/7 |
| 2008/0270977 | A1 * | 10/2008 | Nucci et al. .................... 717/105 |
| 2009/0248596 | A1 * | 10/2009 | Matsumoto et al. ............ 706/12 |
| 2009/0271324 | A1 * | 10/2009 | Jandhyala et al. .............. 705/80 |
| 2011/0153712 | A1 * | 6/2011 | Whetsel ........................ 709/201 |
| 2011/0321154 | A1 * | 12/2011 | Dau et al. ........................ 726/17 |
| 2012/0297358 | A1 * | 11/2012 | Kumar et al. ................. 717/102 |

* cited by examiner

*Primary Examiner* — Don Wong
*Assistant Examiner* — Theodore Hebert
(74) *Attorney, Agent, or Firm* — Lerner, David, Littenberg, Krumholz & Mentlik, LLP

(57) ABSTRACT

A system for facilitating management of one or more programs throughout their lifecycle in an organization is provided. The system comprises a Customer Relationship Management (CRM) module to create one or more programs, an Order Management System (OMS) module to create one or more tracks, and a program management module to create one or more projects. The system further comprises a resource allocation module for allocating resources for executing the one or more programs. The system further comprises a finance budgeting module for budgeting revenue, costs and profitability of the one or more programs. The system further comprises a program module that displays details of the one or more programs, the one or more tracks, and the one or more projects to one or more authorized users. The system further comprises a central repository to store data associated with the one or more programs.

19 Claims, 41 Drawing Sheets

FIG. 3B

| Program Details: IBP-SEZ – Windows Internet Explore | – ☒ |
|---|---|
| ⇧ ⇩ http://www.xyz.com/123 | |

| Home | My Programs | DRGUBSEM | | | | james_c | LOGOUT |
|---|---|---|---|---|---|---|---|
| Program Home | Planning | Tracking | Document | Administration | Reports | | |

DRGUBSEM>Program Home :Edit: DRGUBSEM

| Profile | Previous Versions | Activity Log | Linked Programs | Program Structure | Effort Estimation |
|---|---|---|---|---|---|

Profile

| Program Code: | DRGUBSEM | Planned Start Date: | 01-Mar-2012 |
|---|---|---|---|
| Program Name: | IBP-SEZ | Planned End Date: | 22-Apr-2012 |
| Description: | | Process Type: | Program Management |
| Source Process Template: | Program Management Process Template | Gating Status: | Not Enabled |
| Reason for Gating Change: | | Status: | Open |

SAVE

Program Details: CFS UBS IMPLEMENTATION– Windows Internet Explorer http://www.xyz.com/123

Home | My Programs | DRGUBSEM | | james_c | LOGOUT

Program Home | Planning | Tracking | Document | Reports

DRGUBSEM>Planning>Program Charter

Program Charter
--Program Details
--Business Context
--Program Scope
--Assumptions
--Business Objectives
--Program Phases
--Program High Level Milestone
--Critical Success Factors
--Top Risks
--Program Organization
--Comments
--Workflow
--Previous Versions
--Activity Log
--Attachments Workflow : Unknown

| | | Members | | | |
|---|---|---|---|---|---|
| | | james_c | | | |
| → | | Multiple User | 0 | | |
| | | Unassigned | | | |
| → | | Multiple User | 0 | 0 | |
| | | thomas_v | 0 | 0 | 0 |
| | | Total: | | | |

Route | Reject

Program Scope—Windows Internet Explorer

| Details | Traceability | Comments | Previous Versions | Activity Log | Attachments |

Details

| Derived In-Scope: | The items that are in scope for eBanking Release 11 are all the items that are listed in the Requirement Specification section of the Release Content Definition document. | Derived Out-Scope: | All items that are not included in the Release Content Definition and that are not approved by the Change Control Board of the Release 11. |
|---|---|---|---|
| Organizational In-Scope: | Various units involved in this program are PED and IVS | Organizational Out-Scope: | |
| Temporal In-Scope: | | Temporal Out-Scope: | |
| Financial In-Scope: | PMD programs which are part of the product factory are sponsored. | Financial Out-Scope: | |

[ Route ] [ Reject ]

| | Name | Objectives | Start Date | End Date |
|---|---|---|---|---|
| ☐ 1 | X | obj3 | 01-Mar-2012 | 01-Apr-2012 |
| ☐ 2 | Y | test_obj | 01-Apr-2012 | 01-May-2012 |

Route  Reject  Close  Save

Program Charter
--Program Details
--Business Context
--Program Scope
--Program Phases
--Program High Level Milestone
--Critical Success Factors
--Top Risks
--Program Organization
--Comments
--Workflow
--Previous Versions
--Activity Log DRGUBSEM>Planning>Program Charter Program Home | Planning | Tracking | Document | Administration Home | My Projects | Organization | Process Management | Administration | DRGUBSEM | Reports http://www.xyz.com/123 james_c  LOGOUT

Project Details: Program Management Project # 150% UL Review-- Microsoft Internet Explorer Team List– Microsoft Internet Explorer ⇦ ⇨ http://www.xyz.com/123

| Home | My Projects | Organization | Administration | DRGUBSEM | james_c | LOGOUT |

| Program Home | Planning | Tracking | Process Management | Document | Administration | Reports |

DRGUBSEM>>Planning>>Program Charter

Program Charter
--Program Details
--Business Context
--Program Scope
--Program Phases
--Program High Level Milestone
--Critical Success Factors
--Top Risks
--Program Organization
--Comments
--Workflow
--Previous Versions
--Activity Log

| | | Name | Start Date | End Date | Status |
|---|---|---|---|---|---|
| ☐ | 1 | X | 01-Mar-2012 | 01-Apr-2012 | Open |
| ☐ | 2 | Y | 01-Apr-2012 | 01-May-2012 | Open |

| Route | Reject | Close | Save |

Project Details: Program Management Project # 150% UL Review – Microsoft Internet Explorer http://www.xyz.com/123

| Home | My Projects | Organization | Process Management | Administration | DRGUBSEM | james_c | LOGOUT |

| Program Home | Planning | Tracking | Document | Administration | Reports |

DRGUBSEM>Planning>Program Charter

Program Charter
--Program Details
--Business Context
--Program Scope
--Program Phases
--Program High Level Milestone
--Critical Success Factors
--Top Risks
--Program Organization
--Comments
--Workflow
--Previous Versions
--Activity Log

| | | Critical Success Factors |
|---|---|---|
| ☐ | | |
| ☐ | 1 | X22-09 |
| ☐ | 2 | Y33-90 |

| Route | Reject | Close | Save |

Program Scorecard

Program Details
Program Goals
Strategic Objectives
Execution Effectiveness
Comments
Workflow
Previous Versions
Activity Log
Attachments

Strategic Objectives

| Metric Area | Metric Name | Unit | Goal Planned | Goal Projected |
|---|---|---|---|---|
| | | | | |
| | | | | |
| | | | | |

Scope Chang List– Windows Internet Explorer http://www.xyz.com/123 james_c  LOGOUT

| Home | My Programs | DRGUBSEM |

| Program Home | Planning | Tracking | Document | Reports |

DRGUBSEM>Planning>Program Management Plan

Program Mgmt Plan
--Staffing Plan
--Training Plan
--Risk Mgmt Plan
--Communication Plan
--Infrastructure Plan
  --Computer
    Resources
  --Program
    Methodology

| | Name | Category | Actual Availability Date | Required Date | Required Quantity |
|---|---|---|---|---|---|
| 1 | Desktop | Hardware | 14-Feb-2012 | 15-May-2012 | 130 |
| 2 | Database | Databases | 15-Mar-2012 | 12-June-2012 | 2 |

Route   Reject

Standard Issue Details– Windows Internet Explorer http://www.xyz.com/123

| Home | My Projects | Planning | Organization | Tracking | Process Management | Document | Administration | Administration | DRGUBSEM | Reports | james_c | LOGOUT |

DRGUBSEM>Tracking>Change Management>Standard Issues

Change Management
- Standard Issues
- Change Requests
- Action Items
- Meeting Minutes
- Sub Project
- Reviews
- Milestone Report
- Metric Report
- Customer Management
- Risk Tracking
- Tailoring Questionnaire
- Task Deviation Report
- Tools Tracking

| Details | Traceability | Comments | Workflow | Attachments | Activity Log |

Details

| Submitted Date: | Id: | 1661 | | Submitter ID: | zac_jacob |
|---|---|---|---|---|---|
| | Issue Status: | 01-Jan-2012 | | Issue Type: | Milestone action item |
| | | Closed | | | |
| | Issue Description: | Delay in baselining the requirement of iteration 1 | | Name: | Delay in RA Phase |
| Actual Close Date: | | 01-Mar-2012 | | Actual Start Date: | 01-Feb-2012 |
| | Priority: | High | | Expected Close Date: | 01-May-2012 |
| | Reference: | | | Issue severity: | Critical |
| Mail to Project Admin: | | N | | Mail to issue owner: | Y |
| | | | | Mail to submitter: | N |

[Route] [Reject] [Reopen] [Delete] [Cancel]

DRGUBSEM>Tracking>Track Dashboard

Track Dashboard
- Overview
- Risks
- Goals
- Critical Issues
- Change Requests
- Action Items
- Customer Complaints
- Engagement Feedback
- Track Feedback
- Comments
- Attachments

Overview

| | | | | |
|---|---|---|---|---|
| Schedule | None | Total Costs | None | |
| Efforts | None | Scope | None | |
| Risk | None | Productivity | None | |
| Quality | None | Resource Utilization | None | |
| Program Optimization | None | Stakeholder Satisfaction | None | |
| Overall Performance Indicator* | None | Remarks | | |

Welcome to Reporting Services – Windows Internet Explorer http://www.xyz.com/123

Version: Current

Select a Format

Export

View Report

Program Charter Report for DRGUBSEM

Program Charter
- --Program Details
- --Business Context
- --Program Scope
- --Assumptions
- --Business Objectives
- --Program Phases
- --Program High Level Milestones
- --Critical Success Factors
- --Top Risks
- --Program Organization
- --Comment

PROGRAM CHARTER
Program Details

| Program Code | DRGUBSEM | Program Manager | james_c, peter_mathew |
|---|---|---|---|
| Program Start Date | 01-Apr-2012 | Program End Date | 01-May-2012 |
| Program Sponsor | Michael_HR | Business Process | Business Unit, Sales Organization |
| Program Objectives | This program ideally fit into overall strategy to move into non linear business model with build operate and transfer and earn on per transaction basis. | Program Approach | Build operate and transfer Build Phase: Leverage core competencies to deliver services and outsource |

SYSTEM AND METHOD FOR MANAGEMENT OF A PROGRAM THROUGHOUT ITS LIFECYCLE IN AN ORGANIZATION

FIELD OF THE INVENTION

The present invention relates generally to program management. More particularly, the present invention provides a system and method for managing a program throughout its lifecycle to attain objectives of an organization.

BACKGROUND OF THE INVENTION

A program refers to a group of related projects, work streams and tracks being executed in an organization to achieve a common business objective. Program management refers to management of the group of related projects in a synergistic manner to achieve a common business objective. In the current business environment, effective program management is an essential parameter in the success of any organization and therefore, the organizations have become increasingly interested in effective program management.

In the conventional program management systems the whole process of program management is tracked manually by a Program Management Office (PMO). Due to the manual process, many issues arise in the program management. Some of the issues may comprise like the goals defined at the program level do not flow down to the projects that are to be implemented in the project management system. The risks identified at the program level by the program managers are not visible to the project managers at the project level. Further, there is no visibility to the senior management and to the stakeholders, associated with the programs, regarding the program execution and the program manager's productivity. The PMO is also unable to track the critical paths across the tracks within the program effectively. Furthermore, the rollup information of the project metrics is absent at the program level.

The other limitations of the conventional program management systems include absence of a mechanism to enforce the processes defined by program management framework. The learning from management of a program also does not get captured for use in the new programs. Further, the conventional systems do not have a central repository to capture data across the programs being managed. Also, many of the existing program management systems are designed only to track and monitor the program as opposed to management of the program throughout its life cycle.

Thus, in light of the above, there is a need for a system and method that may facilitate an effective automated program management. Further, there is a need for a system and method that facilitates management of a program throughout its life cycle.

SUMMARY OF THE INVENTION

In an embodiment of the present invention, a system for facilitating management of one or more programs throughout their lifecycle in an organization is provided. the system comprises a Customer Relationship Management (CRM) module that is configured to facilitate creation of one or more programs that are to be managed and to map one or more business opportunities to a program of the one or more programs. The system further comprises approving the one or more programs by one or more stakeholders associated with the one or more programs after the one or more programs have been evaluated. The system further comprises an Order Management System (OMS) module that is configured to facilitate creation of one or more tracks and to map the one or more tracks to the one or more programs. In an embodiment of the present invention a track is a subset of a program and each program of the one or more programs comprises the one or more tracks. The system further comprises a program management module that is configured to facilitate creation of one or more projects and to map the one or more projects to the one or more tracks. In an embodiment of the present invention a project is a subset of the track and each track of the one or more tracks comprises the one or more projects. The system further comprises a resource allocation module that is configured to facilitate allocation of resources for executing the one or more programs. The system further comprises a finance budgeting module that is configured to facilitate budgeting of revenue, costs and profitability of the one or more programs.

The system further comprises a Software as a Service (SaaS) based program module that is configured to display details of the one or more programs, the one or more tracks, and the one or more projects to one or more authorized users on one or more user terminals. The one or more user terminals are communicatively coupled to the program module and the details are displayed in form of web pages. The program module is further configured to plan, track, and report the one or more programs. In an embodiment of the present invention, the program module further facilitates planning of the one or more programs using a planning functionality module, the planning functionality module further comprising: a team list module configured to facilitate planning of team members and their associated roles for the one or more programs being managed; a program charter module, wherein the program charter module is configured to facilitate planning of scope, phases, milestones, success factors, and risks associated with the one or more programs being managed; a program scorecard module, wherein the program scorecard module is configured to facilitate analysis of business objectives associated with the one or more programs being managed, the program scorecard module further configured to facilitate mapping of business objectives to objectives of the one or more programs being managed; a program management plan module, wherein the program management plan module is configured to facilitate generation of a quality plan, a staffing plan, a training plan, a risk management plan, a communication plan, and an infrastructure plan for the one or more programs being managed; and a track scorecard module, wherein the track scorecard module is configured to facilitate analysis of goals and strategic objectives associated with the one or more tracks being managed, the track scorecard module further configured to facilitate generation of a list of goals under a predefined track. The planning functionality module further comprises a workflow component to capture flow of artifacts, associated with the one or more programs, from a submitter of the one or more programs to a reviewer of the one or more programs and then to an approver of the one or more programs.

In an embodiment of the present invention, the program module further facilitates tracking of the one or more programs using a tracking functionality module that further comprises: a change management module configured to facilitate creation of a mechanism for managing a change in scope of the one or more programs being managed; a customer management module configured to facilitate analysis of complaints, feedback, and appreciation from a customer associated with the one or more programs being managed; a risk tracking module configured to facilitate analysis of risks associated with the one or more programs being managed; an audit module, wherein the audit module further comprises: a track dashboard component to list assumptions planned for the one or more projects that are mapped to the one or more tracks; and a program dashboard component to list assumptions planned for the one or more tracks that are mapped to the one or more programs. The tracking functionality module further comprises a financial management module configured to facilitate defining procedures for monitoring financial information of the one or more programs being managed to attain a plurality of strategic objectives associated with the one or more programs being managed; and a stake-holder management module configured to facilitate identification and management of interests of one or more stakeholders associated with the one or more programs being managed.

In an embodiment of the present invention, the program module is further configured to facilitate setting up of risks, goals, and objectives associated with the one or more programs. In an embodiment of the present invention, the program module rolls up the risks, goals, and objectives from the one or more projects to the one or more tracks and from the one or more tracks to the one or more programs. In another embodiment of the present invention, the program module rolls down the risks, goals, and objectives from the one or more programs to the one or more tracks and from the one or more tracks to the one or more projects.

In an embodiment of the present invention, the program module further facilitates reporting of the one or more programs using a report generating functionality module. The report generating functionality module is configured to facilitate generation of reports comprising a status report, a program charter report, a program management plan report, and a track status report.

The system further comprises a central repository communicatively coupled to the program module. The central repository is Role Based Access Controlled (RBAC) and is configured to store data associated with the one or more programs being managed. In an embodiment of the present invention, the generation of the reports is facilitated using the data associated with the one or more programs in the central repository. Further, the generated reports are stored in the central repository.

In another embodiment of the present invention, a system for facilitating management of one or more programs throughout their lifecycle in an organization is provided. the system comprises a Customer Relationship Management (CRM) module that is configured to facilitate creation of one or more programs that are to be managed and to map one or more business opportunities to a program of the one or more programs. The system further comprises approving the one or more programs by one or more stakeholders associated with the one or more programs after the one or more programs have been evaluated. The system further comprises an Order Management System (OMS) module that is configured to facilitate creation of one or more tracks and to map the one or more tracks to the one or more programs. In an embodiment of the present invention a track is a subset of a program and each program of the one or more programs comprises the one or more tracks. The system further comprises a program management module that is configured to facilitate creation of one or more projects and to map the one or more projects to the one or more tracks. In an embodiment of the present invention a project is a subset of the track and each track of the one or more tracks comprises the one or more projects. The system further comprises a resource allocation module that is configured to facilitate allocation of resources for executing the one or more programs, the one or more tracks, and the one or more projects. The system further comprises a finance budgeting module that is configured to facilitate budgeting of revenue, costs and profitability of the one or more programs, the one or more tracks, and the one or more projects.

The system further comprises a Software as a Service (SaaS) based program module that is configured to display details of the one or more programs, the one or more tracks, and the one or more projects to one or more authorized users on one or more user terminals. The one or more user terminals are communicatively coupled to the program module and the details are displayed in form of web pages. The program module is further configured to plan, track, and report the one or more programs, the one or more tracks, and the one or more projects. In an embodiment of the present invention, the program module is further configured to facilitate setting up of risks, goals, and objectives associated with the one or more programs, the one or more tracks, and the one or more projects. In an embodiment of the present invention, the program module rolls up the risks, goals, and objectives from the one or more projects to the one or more tracks and from the one or more tracks to the one or more programs. In another embodiment of the present invention, the program module rolls down the risks, goals, and objectives from the one or more programs to the one or more tracks and from the one or more tracks to the one or more projects. The program module is further configured to facilitate sharing of data associated with the one or more programs, the one or more tracks and the one or more projects between the one or more user terminals.

The system further comprises a central repository communicatively coupled to the program module. The central repository is Role Based Access Controlled (RBAC) and is configured to store data associated with the one or more programs, the one or more tracks, and the one or more projects being managed.

In yet another embodiment of the present invention, a method for facilitating management of one or more programs throughout their lifecycle in an organization is provided. The method comprises creating one or more programs that are to be managed and mapping one or more business opportunities to a program of the one or more programs. The method further comprises creating one or more tracks and mapping the one or more tracks to the one or more programs, wherein a track is a subset of a program and each program of the one or more programs comprises the one or more tracks. The method further comprises creating one or more projects and mapping the one or more projects to the one or more tracks, wherein a project is a subset of the track and each track of the one or more tracks comprises the one or more projects. The method further comprise allocating resources for executing the one or more programs. The method further comprises budgeting revenue, costs and profitability of the one or more programs.

The method further comprises displaying details of the one or more programs, the one or more tracks, and the one or more projects to one or more authorized users on one or more user terminals. The details are displayed in form of web pages. The method further comprises planning, tracking, and reporting of the one or more programs. In an embodiment of the present invention, the step of planning of the one or more programs further comprises: planning of team members and their associated roles for the one or more programs being managed; planning of scope, phases, milestones, success factors, and risks associated with the one or more programs being managed; analyzing business objectives associated with the one or more programs being managed and mapping of business objectives to objectives of the one or more programs being managed; generating a quality plan, a staffing plan, a training plan, a risk management plan, a communication plan, and an infrastructure plan for the one or more programs being managed; and analyzing goals and strategic objectives associated with the one or more tracks being managed and generating of a list of goals under a predefined track. The method further comprises capturing artifacts, associated with the one or more programs, from a submitter of the one or more programs to a reviewer of the one or more programs and then to an approver of the one or more programs.

In an embodiment of the present invention, the step of tracking the one or more programs further comprises: creating a mechanism for managing a change in scope of the one or more programs being managed; analyzing complaints, feedback, and appreciation from a customer associated with the one or more programs being managed; analyzing risks associated with the one or more programs being managed; listing assumptions planned for the one or more projects that are mapped to the one or more tracks; listing assumptions planned for the one or more tracks that are mapped to the one or more programs; defining procedures for monitoring financial information of the one or more programs being managed to attain a plurality of strategic objectives associated with the one or more programs being managed; and identifying and managing interests of one or more stakeholders associated with the one or more programs being managed.

In an embodiment of the present invention, the method further comprises setting up of risks, goals, and objectives associated with the one or more programs. In an embodiment of the present invention, the method further rolls up the risks, goals, and objectives from the one or more projects to the one or more tracks and from the one or more tracks to the one or more programs. In another embodiment of the present invention, the method further rolls down the risks, goals, and objectives from the one or more programs to the one or more tracks and from the one or more tracks to the one or more projects.

In an embodiment of the present invention, the step of reporting of the one or more programs further comprises generation of reports comprising a status report, a program charter report, a program management plan report, and a track status report. The method further comprises storing data associated with the one or more programs being managed in a RBAC central repository. In an embodiment of the present invention, the generation of the reports is facilitated using the data associated with the one or more programs in the central repository. Further, the generated reports are stored in the central repository.

In yet another embodiment of the present invention, a method for facilitating management of one or more programs throughout their lifecycle in an organization is provided. The method comprises creating one or more programs that are to be managed and mapping one or more business opportunities to a program of the one or more programs. The method further comprises creating one or more tracks and mapping the one or more tracks to the one or more programs, wherein a track is a subset of a program and each program of the one or more programs comprises the one or more tracks. The method further comprises creating one or more projects and mapping the one or more projects to the one or more tracks, wherein a project is a subset of the track and each track of the one or more tracks comprises the one or more projects. The method further comprise allocating resources for executing the one or more programs, the one or more tracks and the one or more projects. The method further comprises budgeting revenue, costs and profitability of the one or more programs, the one or more tracks and the one or more projects.

The method further comprises displaying details of the one or more programs, the one or more tracks, and the one or more projects to one or more authorized users on one or more user terminals. The details are displayed in form of web pages. The method further comprises planning, tracking, and reporting of the one or more programs, the one or more tracks and the one or more projects. The method further comprises setting up of risks, goals, and objectives associated with the one or more programs, the one or more tracks and the one or more projects. In an embodiment of the present invention, the method further rolls up the risks, goals, and objectives from the one or more projects to the one or more tracks and from the one or more tracks to the one or more programs. In another embodiment of the present invention, the method further rolls down the risks, goals, and objectives from the one or more programs to the one or more tracks and from the one or more tracks to the one or more projects. The method further comprises sharing of data associated with the one or more programs, the one or more tracks and the one or more projects, between the one or more user terminals. The method further comprises storing data associated with the one or more programs, the one or more tracks and the one or more projects being managed in a RBAC central repository.

In yet another embodiment of the present invention, a computer program product for facilitating management of one or more programs throughout their lifecycle in an organization is provided. The computer program product comprises a non-transitory computer-readable medium having computer-readable program code stored thereon, the computer-readable program code comprising instructions that when executed by a processor, cause the processor to: create one or more programs that are to be managed and mapping one or more business opportunities to a program of the one or more programs. The processor further creates one or more tracks and maps the one or more tracks to the one or more programs. In an embodiment of the present invention, a track is a subset of a program and each program of the one or more programs comprises the one or more tracks. The processor further creates one or more projects and maps the one or more projects to the one or more tracks. In an embodiment of the present invention, a project is a subset of the track and each track of the one or more tracks comprises the one or more projects. The processor further allocates resources for executing the one or more programs. The processor further budgets revenue, costs and profitability of the one or more programs.

The processor further displays details of the one or more programs, the one or more tracks, and the one or more projects to one or more authorized users on one or more user terminals. The details are displayed in form of web pages. The processor further plans, tracks, and reports the one or more programs. In an embodiment of the present invention, the step of planning of the one or more programs further comprises: planning of team members and their associated roles for the one or more programs being managed; planning of scope, phases, milestones, success factors, and risks associated with the one or more programs being managed; analyzing business objectives associated with the one or more programs being managed and mapping of business objectives to objectives of the one or more programs being managed; generating a quality plan, a staffing plan, a training plan, a risk management plan, a communication plan, and an infrastructure plan for the one or more programs being managed; and analyzing goals and strategic objectives associated with the one or more tracks being managed and generating of a list of goals under a predefined track. The processor further captures artifacts, associated with the one or more programs, from a submitter of the one or more programs to a reviewer of the one or more programs and then to an approver of the one or more programs.

In an embodiment of the present invention, the step of tracking the one or more programs further comprises: creating a mechanism for managing a change in scope of the one or more programs being managed; analyzing complaints, feedback, and appreciation from a customer associated with the one or more programs being managed; analyzing risks associated with the one or more programs being managed; listing assumptions planned for the one or more projects that are mapped to the one or more tracks; listing assumptions planned for the one or more tracks that are mapped to the one or more programs; defining procedures for monitoring financial information of the one or more programs being managed to attain a plurality of strategic objectives associated with the one or more programs being managed; and identifying and managing interests of one or more stakeholders associated with the one or more programs being managed.

In an embodiment of the present invention, the processor further sets up of risks, goals, and objectives associated with the one or more programs. In an embodiment of the present invention, the processor further rolls up the risks, goals, and objectives from the one or more projects to the one or more tracks and from the one or more tracks to the one or more programs. In another embodiment of the present invention, the processor further rolls down the risks, goals, and objectives from the one or more programs to the one or more tracks and from the one or more tracks to the one or more projects.

In an embodiment of the present invention, the step of reporting of the one or more programs further comprises generation of reports comprising a status report, a program charter report, a program management plan report, and a track status report. The processor further stores data associated with the one or more programs being managed in a RBAC central repository. In an embodiment of the present invention, the generation of the reports is facilitated using the data associated with the one or more programs in the central repository. Further, the generated reports are stored in the central repository.

In yet another embodiment of the present invention, a computer program product for facilitating management of one or more programs throughout their lifecycle in an organization is provided. The computer program product comprises a non-transitory computer-readable medium having computer-readable program code stored thereon, the computer-readable program code comprising instructions that when executed by a processor, cause the processor to: create one or more programs that are to be managed and mapping one or more business opportunities to a program of the one or more programs. The processor further creates one or more tracks and maps the one or more tracks to the one or more programs. In an embodiment of the present invention, a track is a subset of a program and each program of the one or more programs comprises the one or more tracks. The processor further creates one or more projects and maps the one or more projects to the one or more tracks. In an embodiment of the present invention, a project is a subset of the track and each track of the one or more tracks comprises the one or more projects. The processor further allocates resources for executing the one or more programs, the one or more tracks, and the one or more projects. The processor further budgets revenue, costs and profitability of the one or more programs, the one or more tracks, and the one or more projects.

The processor further displays details of the one or more programs, the one or more tracks, and the one or more projects to one or more authorized users on one or more user terminals. The details are displayed in form of web pages. The processor further plans, tracks, and reports the one or more programs, the one or more tracks, and the one or more projects.

In an embodiment of the present invention, the processor further sets up of risks, goals, and objectives associated with the one or more programs, the one or more tracks, and the one or more projects. In an embodiment of the present invention, the processor further rolls up the risks, goals, and objectives from the one or more projects to the one or more tracks and from the one or more tracks to the one or more programs. In another embodiment of the present invention, the processor further rolls down the risks, goals, and objectives from the one or more programs to the one or more tracks and from the one or more tracks to the one or more projects. The processor further shares data associated with the one or more programs, the one or more tracks and the one or more projects, between the one or more user terminals. The processor further stores data associated with the one or more programs, the one or more tracks, and the one or more projects being managed in a RBAC central repository.

BRIEF DESCRIPTION OF THE DRAWINGS

The present invention is described by way of embodiments illustrated in the accompanying drawings wherein:

FIGS. 3A and 3B depict exemplary web pages respectively rendered by the program module in accordance with various embodiments of the present invention;

FIG. 5 depicts an exemplary web page rendered by the planning functionality module in accordance with an embodiment of the present invention;

Figure 7B:
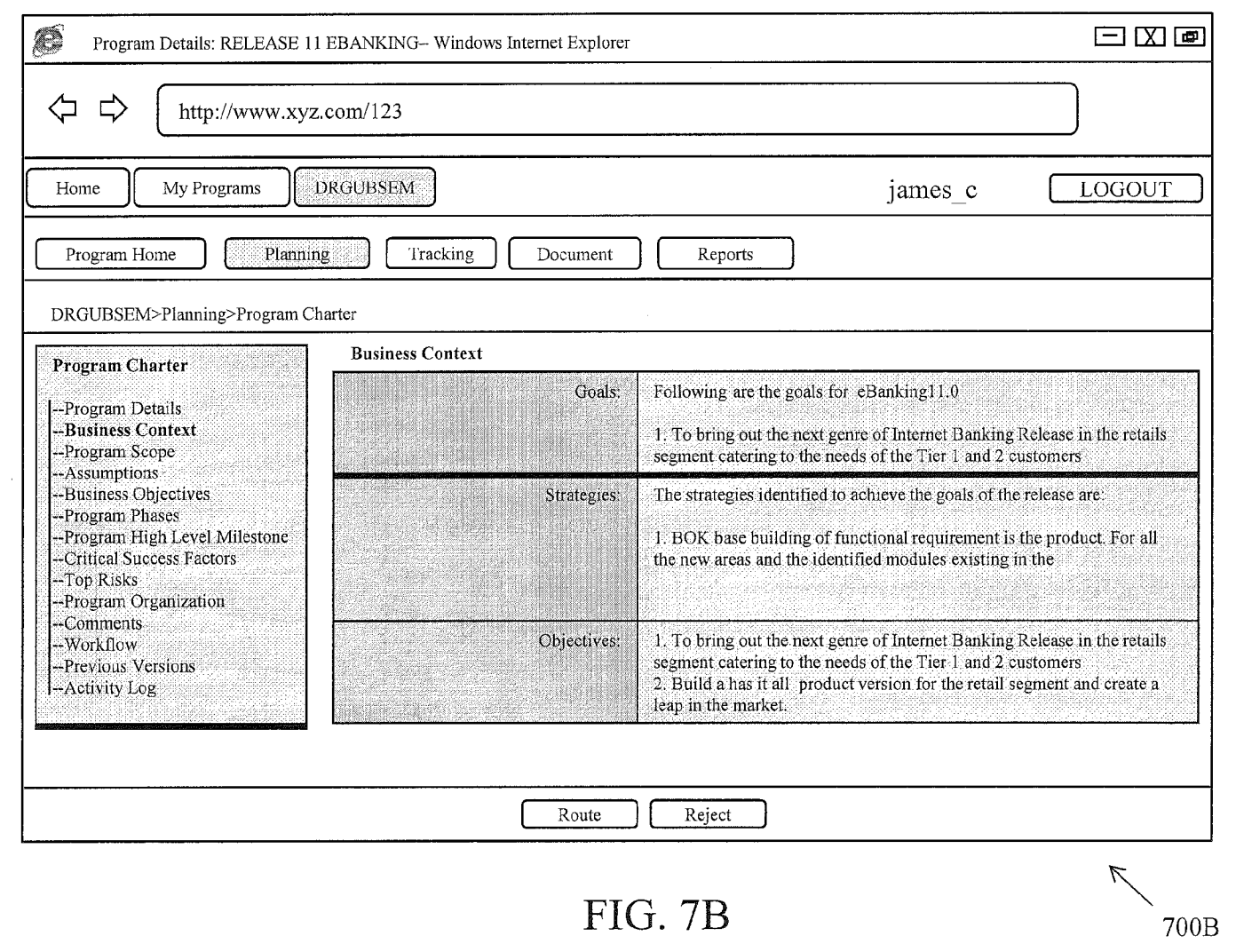
Figure 7G:
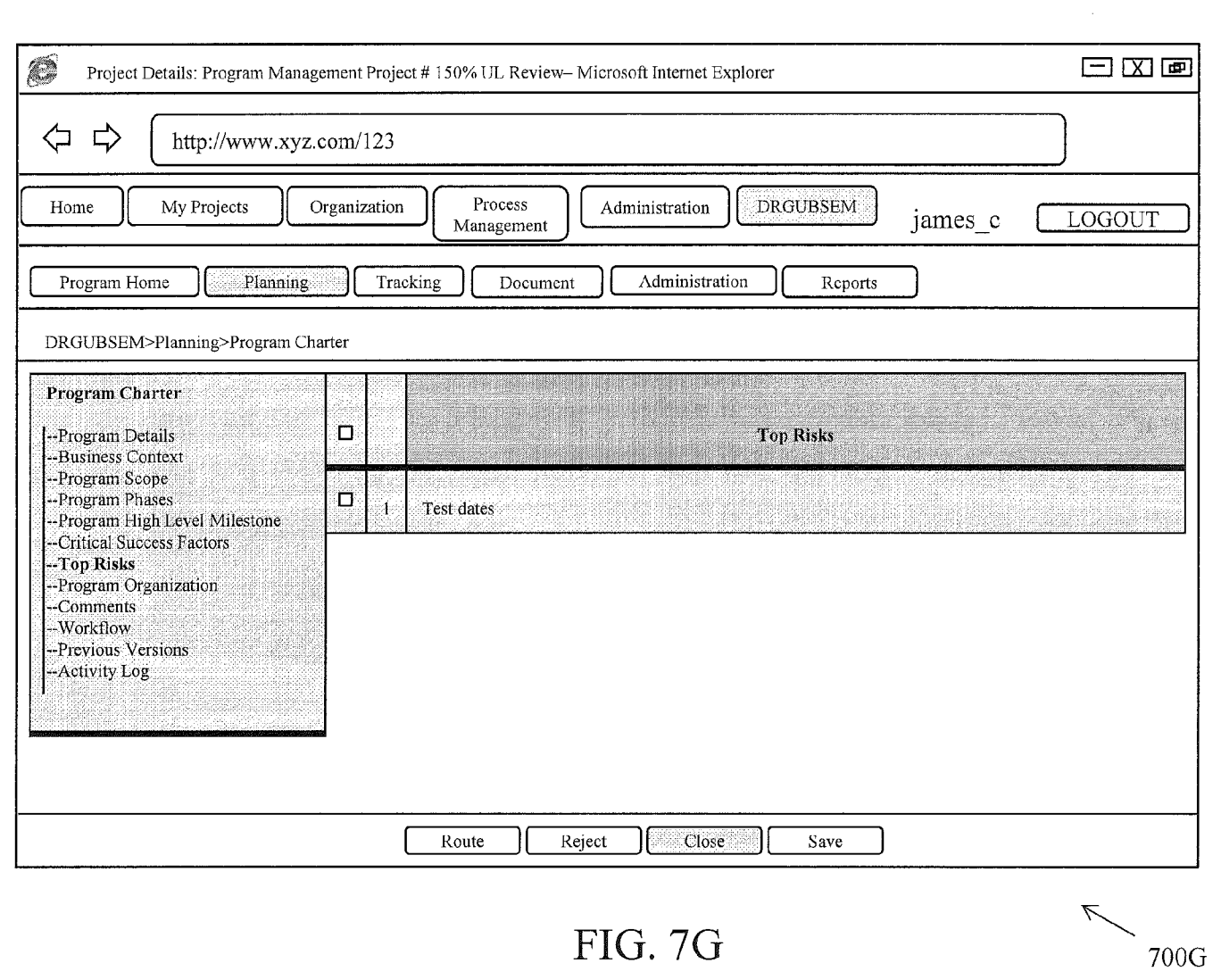
Figure 7H:
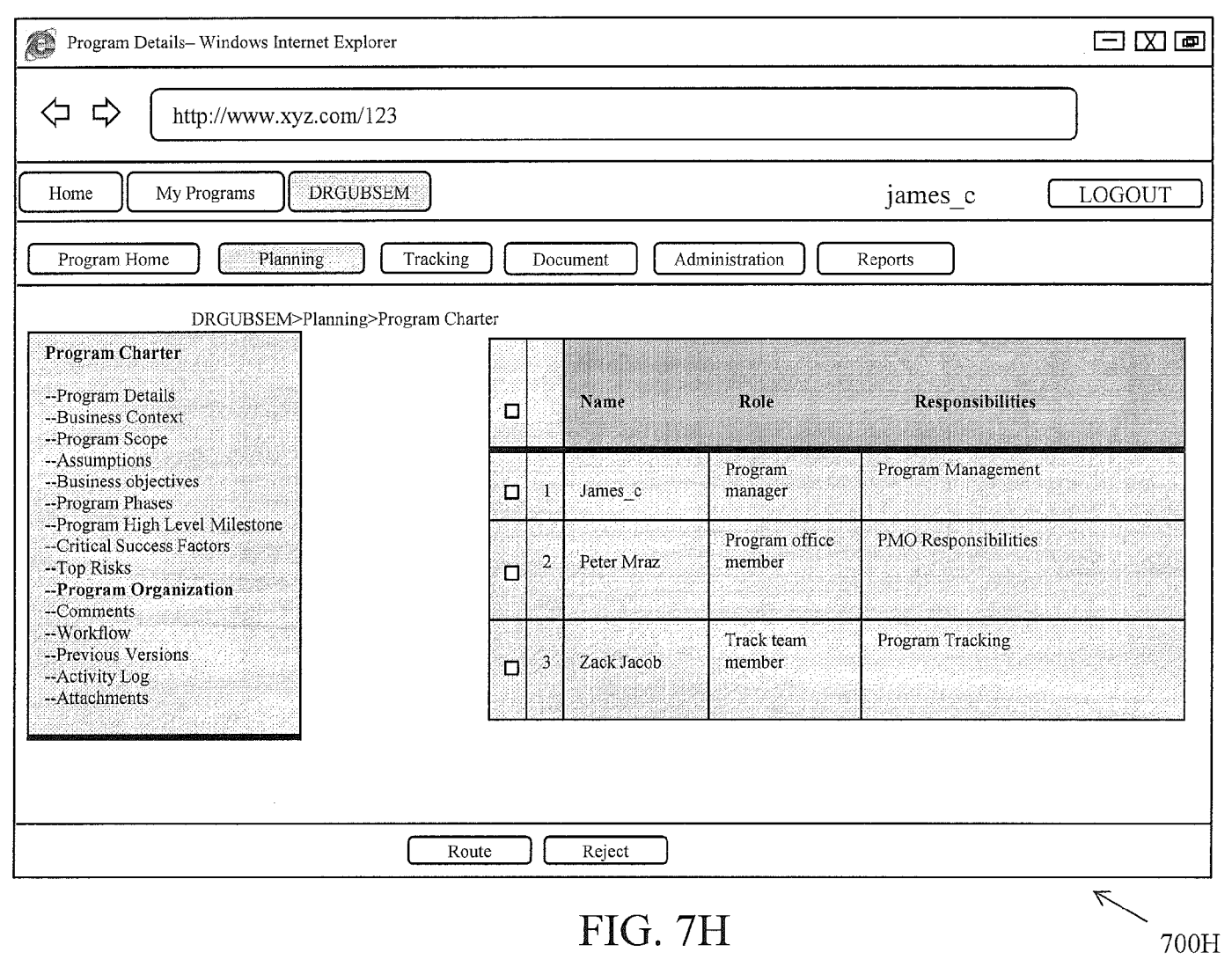
Figure 7L:
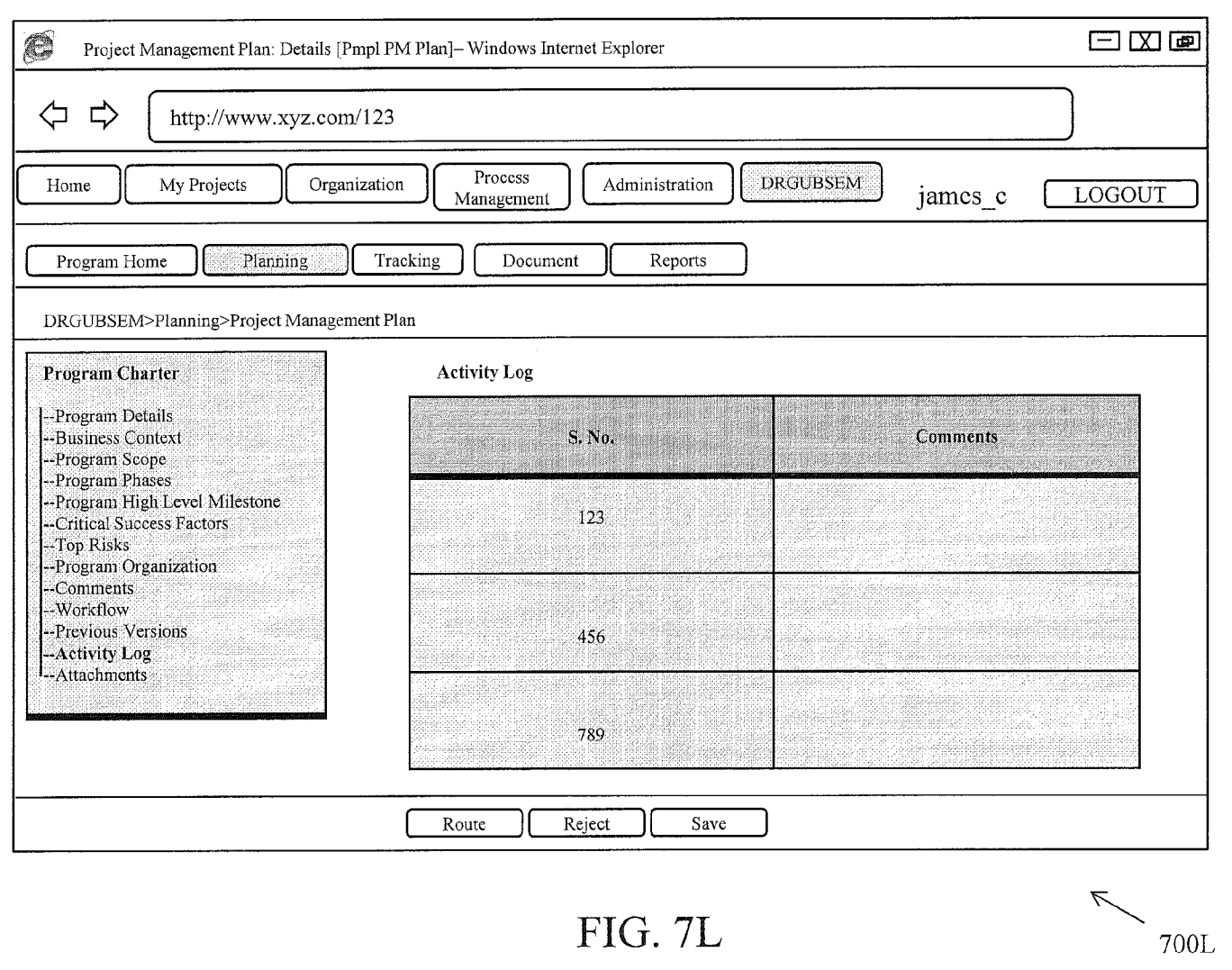

FIGS. 7A-7L depict exemplary web pages rendered by a program charter module in accordance with various embodiments of the present invention;

FIG. 8 depicts an exemplary web page rendered by the program scorecard module in accordance with an embodiment of the present invention;

FIGS. 9A-9G depict exemplary web pages rendered by the program management plan module in accordance with various embodiments of the present invention;

Figure 11:
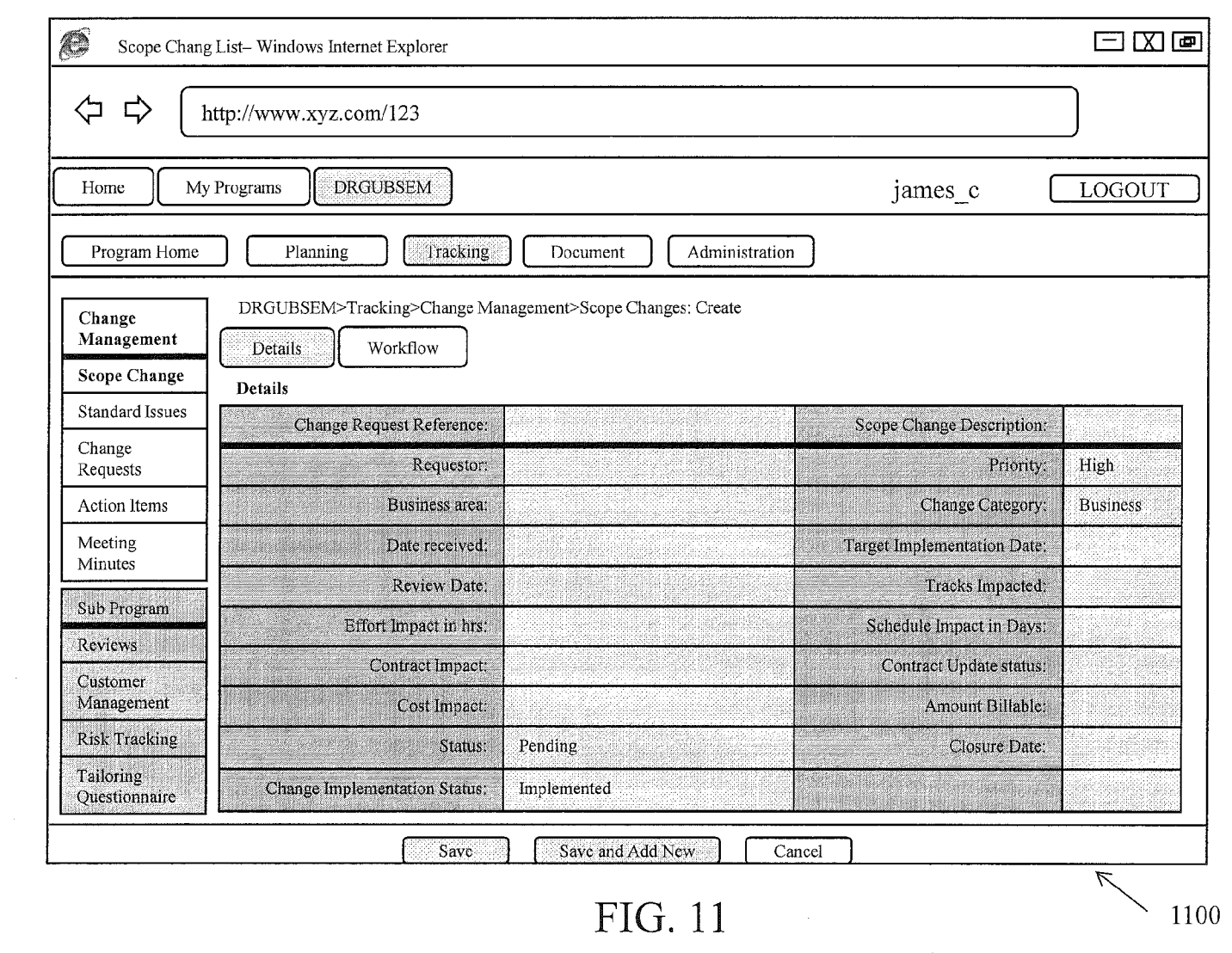
Figure 16:
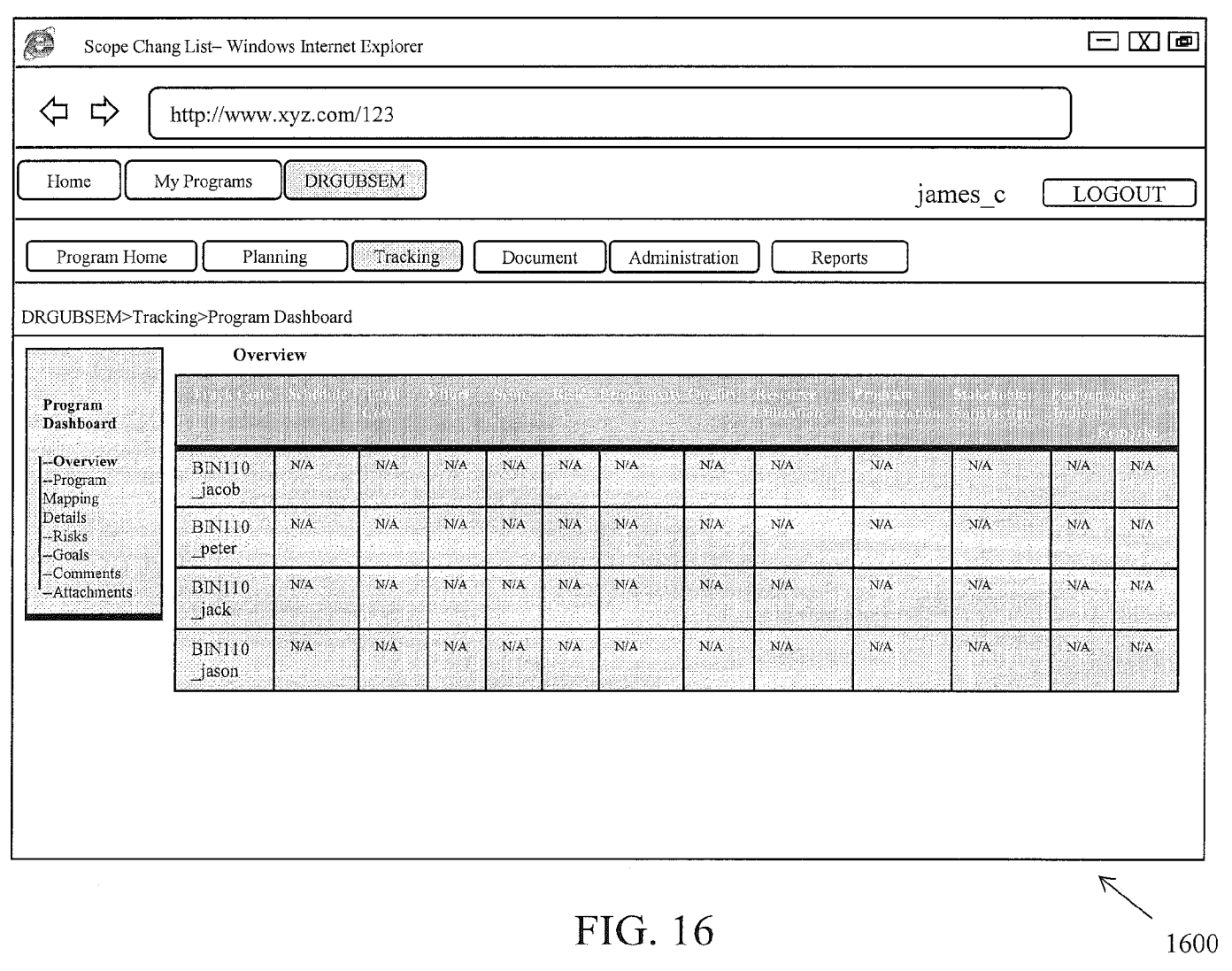

FIGS. 11-18 depict exemplary web pages rendered by the tracking functionality module in accordance with an embodiment of the present invention;

Figure 19A:
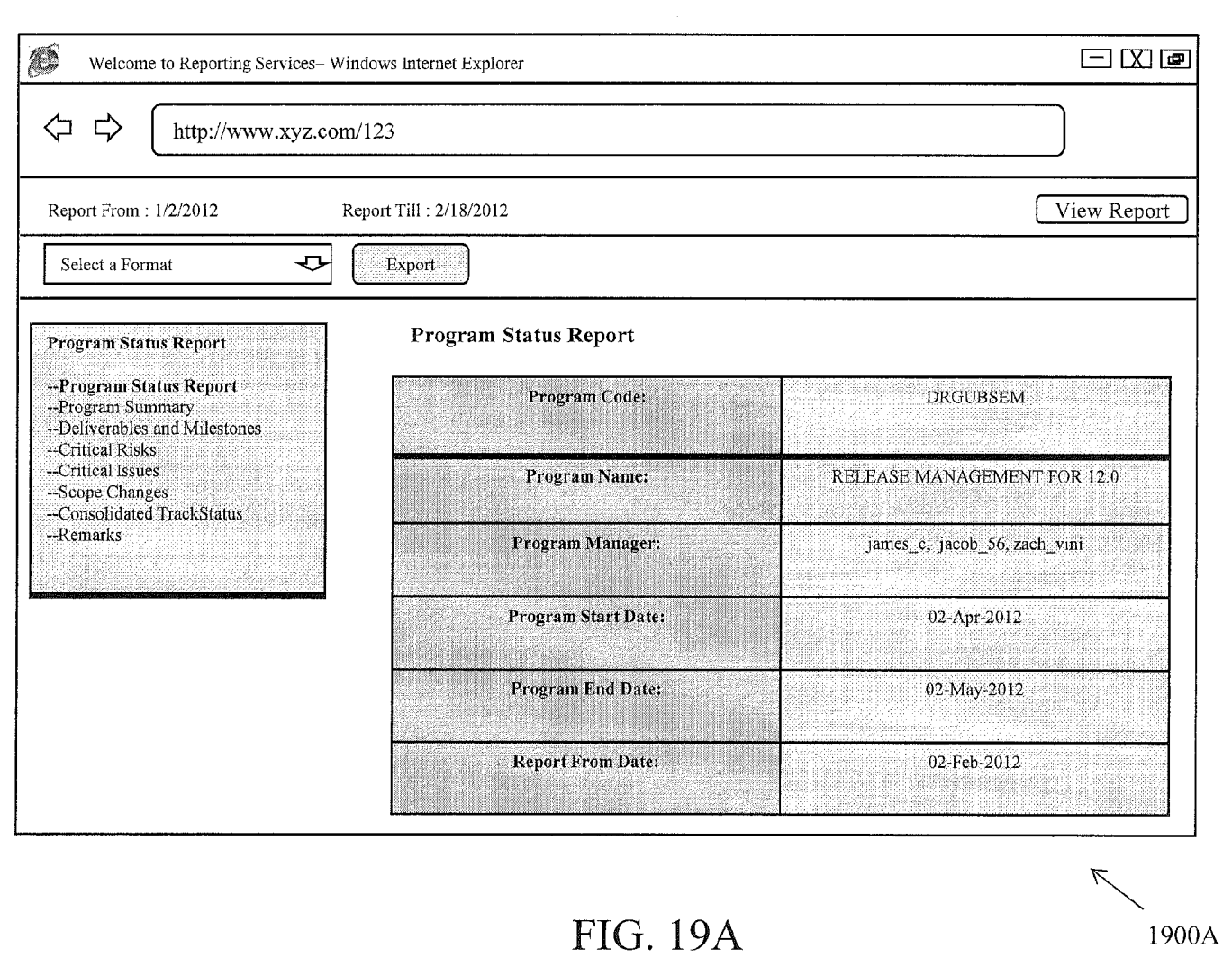

FIGS. 19A-19D depict exemplary web pages rendered by the reporting functionality module in accordance with various embodiments of the present invention;

DETAILED DESCRIPTION

A system, a method and a computer program product for facilitating management of lifecycle of one or more programs in an organization described herein. The invention provides a system, a method and a computer program product for creating one or more programs, one or more tracks, and one or more projects. Further, the one or more programs are mapped to one or more business opportunities, the one or more tracks are mapped to one or more programs and the one or more projects are mapped to the one or more tracks. The invention further provides a system, a method and a computer program product for facilitating resource allocation and budgeting of revenue, costs and profitability for the one or more programs, the one or more tracks and the one or more projects. The invention further provides a system, a method and a computer program product for displaying details of the one or more programs, the one or more tracks, and the one or more projects to one or more authorized users on one or more user terminals, wherein the one or more user terminals are communicatively coupled to the program module and the details are displayed in form of web pages. The one or more programs, the one or more tracks, and the one or more projects are then planned, tracked and reported. The invention further provides a system, a method and a computer program product for storing data associated with the one or more programs, the one or more tracks, and the one or more projects being managed in a Role Based Access Control (RBAC) central repository.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the acorganizationing drawings.

Figure 1:
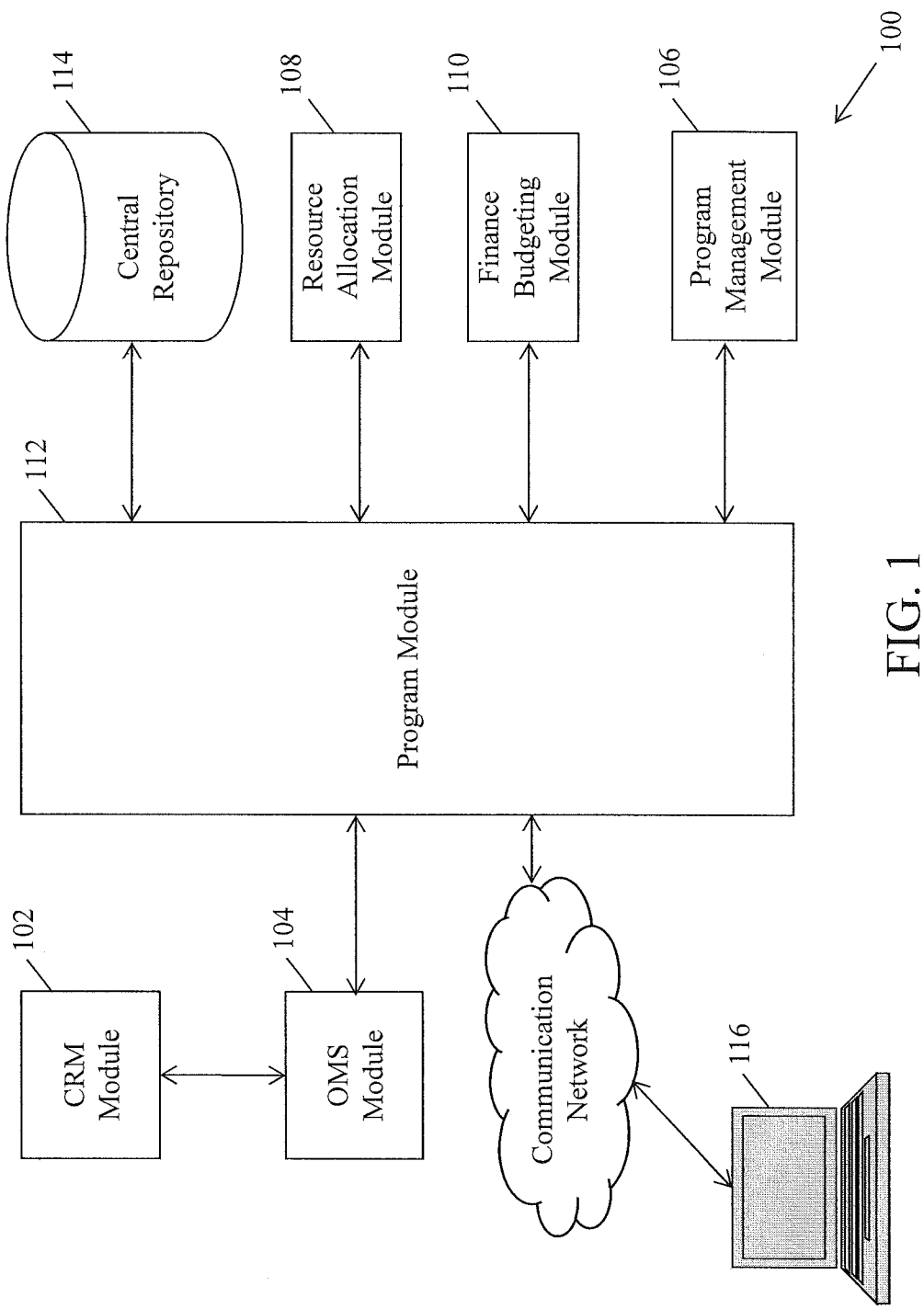
FIG. 1 is a block diagram illustrating a system for facilitating management of one or more programs throughout their lifecycle in an organization in accordance with an embodiment of the present invention.

FIG. 1 is a block diagram illustrating a system for facilitating management of one or more programs throughout their lifecycle in an organization in accordance with an embodiment of the present invention. In an exemplary embodiment of the present invention, the organization is an Information Technology (IT) organization that provides IT services and IT solutions to its client. The system 100 includes a Customer Relationship Management (CRM) module 102, an Order Management System (OMS) module 104, a program management module 106, a resource allocation module 108, a finance budgeting module 110, a program module 112, and a central repository 114. The CRM module 102 facilitates management of customer relationships in an organized way in the organization. In various embodiments of the present invention, the CRM module 102 may be hardware or software or hardware with embedded software or firmware that is configured to facilitate creation of one or more programs that are to be managed. The CRM module 102 is further configured to map one or more business opportunities to a program of the one or more programs. In context of the IT organization, every pursuit with a client may be treated as an business opportunity. The pursuit may be aimed at winning a project, program, transformational program etc. Within the program, there may be multiple business opportunities created for different contractual pursuits. In an embodiment of the present invention, the business opportunities may be mapped to the program at later stages of the program management. The CRM module 102 may be accessed by an authorized user that manages and owns the customer relationship. After the one or more programs have been created, the one or more programs may undergo a program evaluation process to qualify the one or more programs. In an exemplary embodiment of the present invention, the program evaluation process may be a manual process that may involve interviewing the team, associated with the one or more programs, by senior management of the organization and/or Program Management Office (PMO) team.

After the evaluation process, the one or more programs, undergo the process of approval from stakeholders associated with the one or more programs. The stakeholders may be individuals within the client's organization or the IT organization who hold an interest in the outcome of the program. A stakeholder may also be a vendor who works within the scope of the program. Further, the one or more programs may comprise one or more tracks and the one or more tracks may comprise one or more projects. In an embodiment of the present invention, a track is a subset of a program and each program of the one or more programs comprises one or more tracks. A project is a subset of the track and each track of the one or more tracks comprises one or more projects. Further, every project, track and program has its respective associated objective. A track may achieve its associated objective when each project within the track has achieved its objective and each program may achieve its associated objective when each track within the program has achieved its objective. Thus, each project and track is focused on achieving a specific objective, while a program is focused on delivering specific measurable business outcomes. In an exemplary embodiment of the present invention, a program manager manages a program, a track lead manages a track and a project manager manages a project. Table 1 depicts an exemplary program 'Corporate E-banking' comprising plurality of associated tracks and projects.

TABLE 1

| Program | Track | Project |
|---|---|---|
| Corporate E-banking | Program Management | Program Management |
| | Application Development | Product Integration |
| | | Application Customization and Integration |
| | | Testing |
| | Vendor | Product Management |
| | | Sub contract Management |
| | Change Management | Communication |
| | | Training |
| | Infrastructure | Software |
| | | Hardware |
| | Rollout | Implementation |
| | Application Maintenance | Incident Support |
| | | Enhancements and Fixes |

In various embodiments of the present invention, the OMS module 104 may be hardware or software or hardware with embedded software or firmware that is configured to facilitate creation of the one or more tracks and to map the one or more tracks to the one or more programs. In various embodiments of the present invention, the program management module 106 may be hardware or software or hardware with embedded software or firmware that is configured to facilitate creation of the one or more projects and map the one or more projects to the one or more tracks. The program management module 106 also tracks the data associated with scope, assumptions, estimates, goals, and risks associated with the one or more projects. In various embodiments of the present invention, the resource allocation module 108 may be hardware or software or hardware with embedded software or firmware that is configured to facilitate allocation of resources for executing the one or more programs, the one or more tracks, and the one or more projects In exemplary embodiments of the present invention, the resources may include human resources. Further, in various embodiments of the present invention, finance budgeting module 110 may be hardware or software or hardware with embedded software or firmware that is configured to facilitate budgeting of revenue, costs and profitability of the one or more programs, the one or more tracks, and the one or more projects.

In various embodiments of the present invention, the program module 112 may be hardware or software or hardware with embedded software or firmware that is configured to display details of the one or more programs, the one or more tracks, and the one or more projects to one or more authorized users on one or more user terminals including user terminal 116 as depicted in FIG. 1. In an embodiment of the present invention, the program module 112 is Software as a Service (SaaS) based and the one or more user terminals are communicatively coupled to the program module through a communication network from different geographic locations. The one or more user terminals may communicate with the program module using Hypertext Transfer Protocol Secure (HTTPS) or Hypertext Transfer Protocol (HTTP) over the communication network comprising, without any limitation, Local Area Network (LAN), a Metropolitan Area Network (MAN), a Wide Area Network (WAN) like Internet, and a private network. Further, the program module 112 displays the details of the one or more programs, the one or more tracks, and the one or more projects in form of web pages or Extensible Markup Language (XML) on the one or more user terminals. The program module 112 is further configured to facilitate planning, tracking, and reporting of the one or more programs, the one or more tracks, and the one or more projects using a planning functionality module, a tracking functionality module, and a report generating functionality module respectively. The program module 112 is further configured to facilitate setting up of risks, goals, and objectives associated with the one or more programs, the one or more tracks and the one or more projects. In an embodiment of the present invention, the program module 112 rolls up the risks, goals, and objectives from the one or more projects to the one or more tracks and from the one or more tracks to the one or more programs. In another embodiment of the present invention, the program module 112 rolls down the risks, goals, and objectives from the one or more programs to the one or more tracks and from the one or more tracks to the one or more projects. The program module 112 is further configured to facilitate sharing of data, associated with the one or more programs, the one or more tracks and the one or more projects, between the one or more user terminals. In various embodiments of the present invention, the sharing of data between the one or more user terminals may be facilitated via chats and emails.

In various embodiments of the present invention, the central repository 114 may be hardware or hardware with embedded software or a firmware for storing the data associated with the one or more programs, the one or more tracks, and the one or more projects. The central repository 114 may be a memory or a storage device operable to store the data associated with the one or more programs, the one or more tracks, and the one or more projects. For example, the central repository 114 may be a Random Access Memory (RAM), a Read only Memory (ROM), an optical storage device, a magnetic media, etc., either integrated with the system 100 or configured as a separate device. The data associated with the one or more programs, the one or more tracks, and the one or more projects may be stored in the central repository 114 in a relational manner, in a flat file manner or any other suitable manner. Further, in an embodiment of the present invention, access mechanism associated with the central repository 114 is RBAC. The exemplary roles supported by the central repository 114 may comprise, without any limitation, program manager, project manager, track lead, team member, and stakeholder. In an embodiment of the present invention, the central repository 114 may facilitate access of the data associated with the one or more programs, the one or more tracks, and the one or more projects in the form of syndicated data streams over a communication network including, without any limitation, LAN, MAN, WAN like Internet, and private network.

In an embodiment of the present invention, the CRM module 102, the OMS module 104, the program management module 106, the resource allocation module 108, the finance budgeting module 110, the program module 112, and the central repository 114 of system 100 as described in the present invention may be embodied in the form of a computer system. Typical examples of a computer system may include a general-purpose computer, a programmed microprocessor, a micro-controller, a peripheral integrated circuit element, and other devices or arrangements of devices. The computer system may comprise a computer, an input device, and a display unit. The computer may also include a non-transitory computer readable medium which may comprise a RAM, a ROM; a mass storage typically for more permanent storage, such as optical discs, forms of magnetic storage like hard disks, tapes, drums, cards and other types, processor registers, cache memory, volatile memory, non-volatile memory; an optical storage such as a Compact Disc (CD), a Digital Video Disc (DVD), and the like. Further, the non-transitory computer readable medium stores methods, programs, codes, and program instructions. The computer may also comprise a processor, which is communicatively coupled to the non-transitory computer readable medium and a communication bus. The processor may be part of, without any limitation, a server, a client, a network infrastructure, a mobile computing platform, and a stationary computing platform. The processor may be any kind of computational or processing device capable of executing program instructions, codes, binary instructions and the like. The processor may be or include, without any limitation, a signal processor, a digital processor, an embedded processor, a microprocessor, and a co-processor that may directly or indirectly facilitate execution of program code or program instructions stored thereon. The processor may include memory that stores methods, processes, codes, and instructions as described in context of the invention. The processor may access the non-transitory computer readable medium through an interface.

In an embodiment of the present invention, the CRM module 102, the OMS module 104, the program management module 106, the resource allocation module 108, the finance budgeting module 110, the program module 112, and the central repository 114 may reside on a single computer system. In another embodiment of the present invention, the CRM module 102, the OMS module 104, the program management module 106, the resource allocation module 108, the finance budgeting module 110, the program module 112, and the central repository 114 may reside on different computer systems and may be communicatively coupled to each other via a communication network.

In an embodiment of the present invention, the CRM module 102, the OMS module 104, the program management module 106, the resource allocation module 108, the finance budgeting module 110, the program module 112, and the central repository 114 may be hosted by an IT organization for facilitating management of the one or more programs throughout their lifecycle. In another embodiment of the present invention, the CRM module 102, the OMS module 104, the program management module 106, the resource allocation module 108, the finance budgeting module 110, the program module 112, and the central repository 114 may be hosted by a third party and may be accessed by a plurality of IT organizations over a cloud network for program management.

Figure 2:
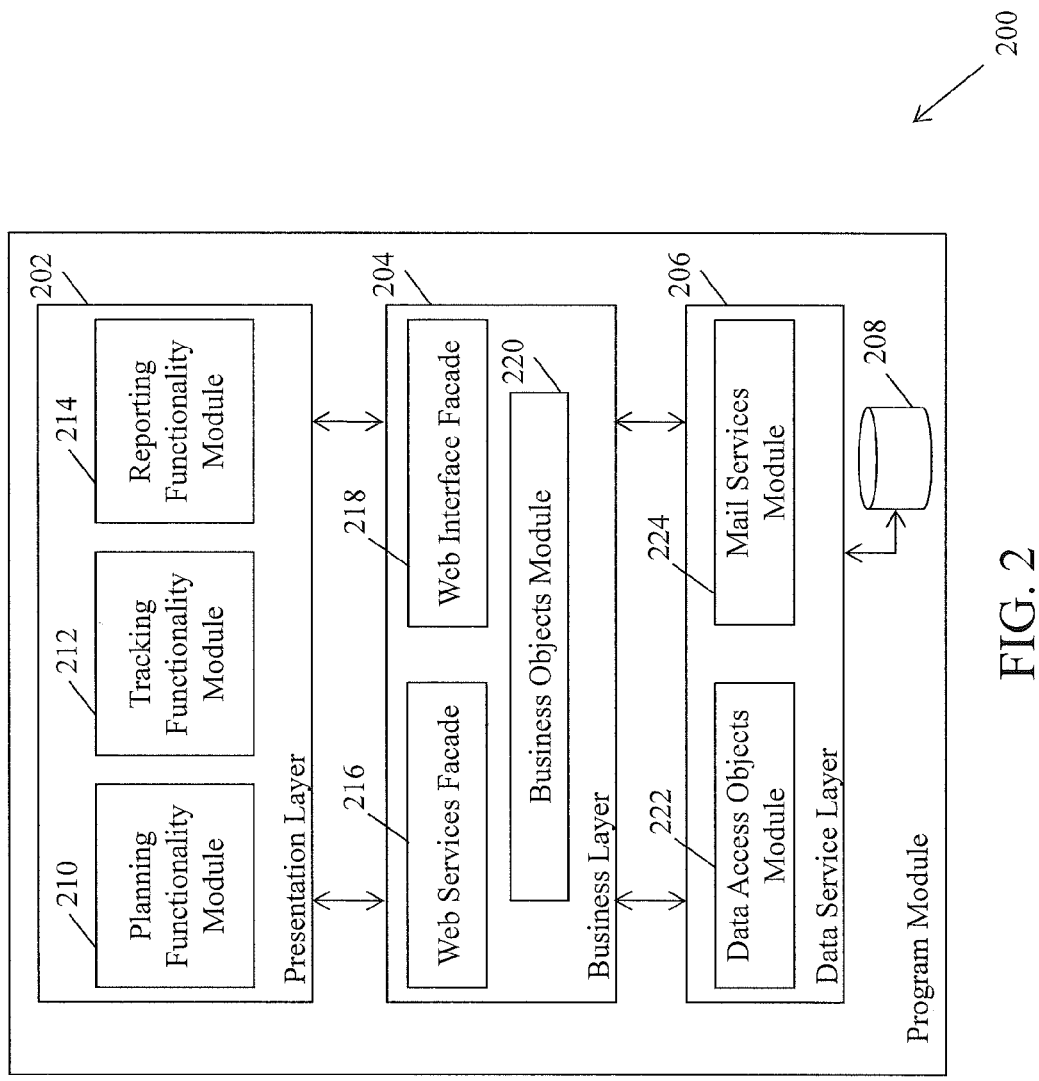
FIG. 2 is a detailed block diagram of a program module in accordance with an embodiment of the present invention.

FIG. 2 is a detailed block diagram of a program module in accordance with an embodiment of the present invention. The program module 200 includes a presentation layer 202, a business layer 204, and a data service layer 206 communicatively coupled to a central repository 208. The presentation layer 202 facilitates manipulation of data for the performance of tasks. In various embodiments of the present invention, the tasks may include, without limitations, planning of the one or more programs, tracking of the one or more programs and reporting of the one or more programs. The data service layer 206 provides data that is to be processed by the presentation layer 202. The business layer 204 acts as an intermediate layer between the presentation layer 202 and the data service layer 206 that serve as a communication link. The presentation layer 202 issues requests for retrieval of specified data stored at the data service layer 206 to the business layer 204 rather than communicating directly with the data service layer 206. In response to such a request, the business layer 204 is then responsible for retrieving the specified data from the data service layer 206 and providing the retrieved data to the presentation layer 202. The presentation layer 202 processes this data to perform a specific task.

Further, the program module 200 comprises a planning functionality module 210 for facilitating planning of the one or more programs, a tracking functionality module 212 for facilitating tracking of the one or more programs, and a reporting functionality module 214 for facilitating reporting of the one or more programs. The planning functionality module 210, the tracking functionality module 212, and the reporting functionality module 214 operate at the presentation layer 202. In embodiments of the present invention, the planning functionality module 210 may be hardware or software or hardware with embedded software or a firmware that is configured to create charter, scorecards, and plans for the one or programs, the one or more tracks, and the one or more projects. A charter may refer to a statement of objectives in a program, track or project. The charter also sets out detailed goals, roles and responsibilities, identifies the main stakeholders, and the level of authority of the program manager, the track lead and the project manager. A scorecard facilitates determining success of the one or programs, the one or more tracks, and the one or more projects. The scorecard takes into account the criteria that needs to be met for the one or programs, the one or more tracks, and the one or more projects to be a success. The tracking functionality module 212 may be hardware or software or hardware with embedded software or a firmware that is configured to comprise a change management module, a customer management module, an audit module, a financial management module, and a risk tracking module through which the one or programs, the one or more tracks, and the one or more projects are managed in a systematic way. The reporting functionality module 214 may be hardware or software or hardware with embedded software or a firmware that is configured to facilitate generation of various types of reports including, without limitations, program status reports, program charter reports, program management plan reports, and track status reports associated with the one or programs, the one or more tracks, and the one or more projects.

Further, the business layer 204 includes a web service facade 216, a web interface facade 218, and a business objects module 220. The web service facade 216 is configured to obtain program details from the CRM module 102. The web interface facade 218 is built using plain JavaServer Pages. In embodiments of the present invention, the business object module 220 may be hardware or software or hardware with embedded software or a firmware that is configured to receive requests from one of the modules of the presentation layer 202 for data stored in the central repository 208 and provide the requested module of the presentation layer 202 with the specified data. After a request is a received for data from one of the any of the modules of the presentation layer 202, the business object module 220 creates a business object for that request. The business object serves as the communication link for that request and is responsible for establishing a view of the specified data for the module after the data has been retrieved from the central repository 208. In an embodiment of the present invention, the business object is created for each request received by the business object module 220. In an alternative embodiment of the present invention, a business object may be associated with the requesting module of the presentation layer 202, rather than each request, and thus, multiple requests from a module may communicate with a single business object. The data service layer 206 includes a data access objects module 222 and mail services module 224. The data access objects module 222 facilitates isolation of the central repository 208.

In an embodiment of the present invention, each of the layers (202, 204, and 206) of the program module 200 are software modules that are designed to interact with one another to facilitate management of retrieval of stored data for various other modules in the system 100. It will be apparent to a person of ordinary skill in the art that any of the computer-implemented operations performed by these layers (202, 204, and 206) may also include interaction with one or more hardware modules in the system 100. In an embodiment of the present invention, each of these layers (202, 204 and 206) resides on a single computer system. In another embodiment of the present invention, at least one of these layers (202, 204 and 206) resides on a computer system separate from the other two layers (202, 204 and 206). In an exemplary embodiment, the presentation layer 202 may reside on a client computer system and the business layer 204 and the data service layer 206 may both reside on a server computer system. In yet another embodiment of the present invention, each layer (202, 204 and 206) may reside on a separate computer system from the other.

Figure 3A:
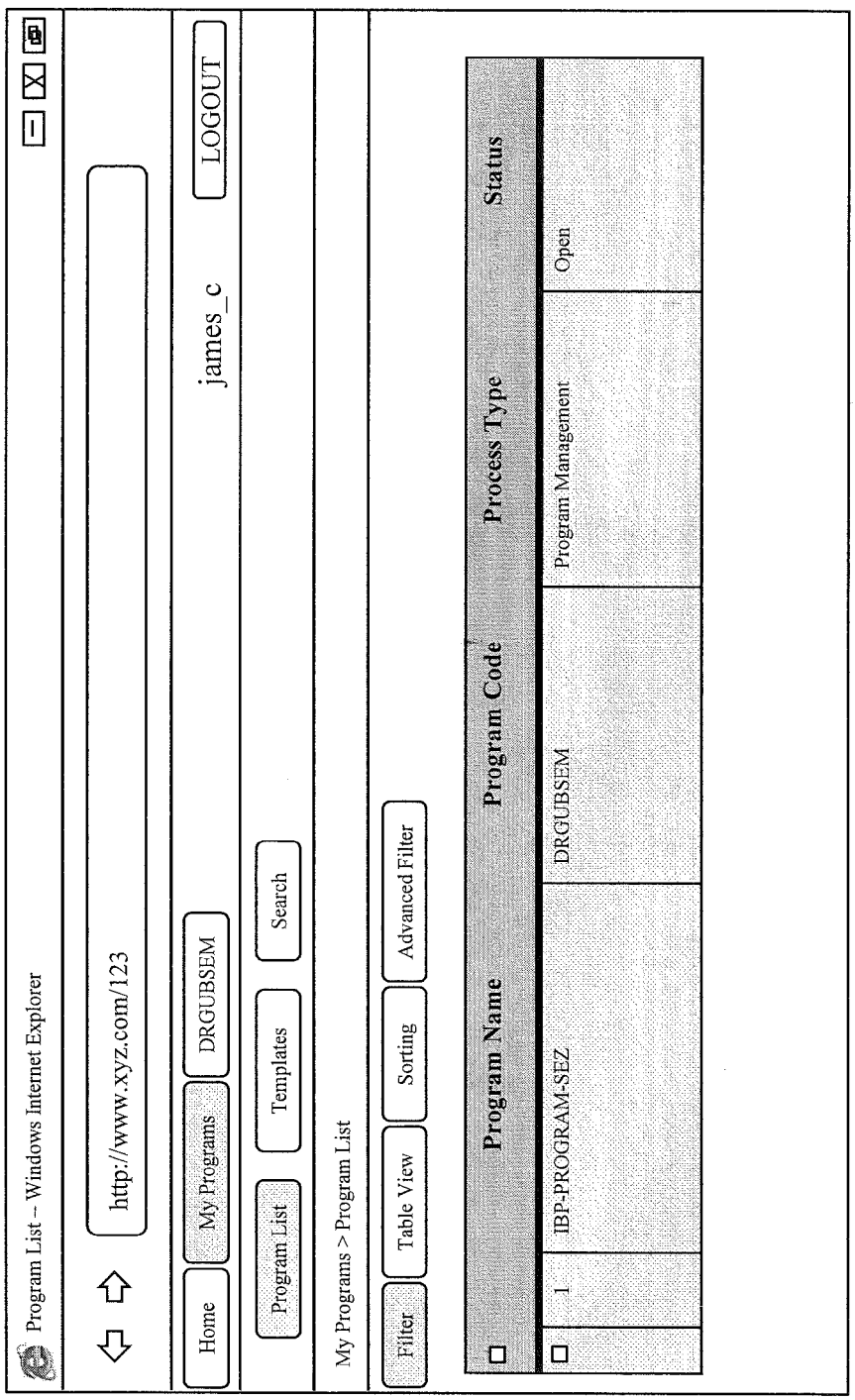

Further, the program module 200 facilitates rendering of web pages on the communicatively coupled one or more user terminals. FIGS. 3A and 3B depict exemplary web pages 300A and 300B respectively rendered by the program module 200 in accordance with various embodiments of the present invention. In an embodiment of the present invention, an authorized user upon logging into the program module 200 may view a home page. The authorized user may then click on a button 'My Programs' to view the web page 300A. In an embodiment of the present invention, the authorized user access the program module 200 over the LAN. In another embodiment of the present invention, the authorized user access the program module 200 over the WAN. In embodiments of the present invention, the authorized user may be, without limitations, the program manager, the project manager, the track lead, the stake holder, a customer, a vendor, and a team member. In an embodiment of the present invention, the program manager may invite the team members to the team list. The invited members may have access to the one or more programs. Hereinafter, the authorized user accessing the program module 200 may be interchangeably referred to as a user. Further, hereinafter, references to the actions of the user of the program module 200 or the one or more user terminals should be understood to mean actions that are performed by a user using a web browser rendered on a user terminal. The rendering of these web pages is facilitated by the program module 200 in response to requests from the web browser of the one or more user terminals. In an embodiment of the present invention, the web page 300A may include a navigation button to display the one or more programs under for an authorized user. In an embodiment of the present invention, the navigation button may be 'My Programs'. The user may click on 'My Programs' to view the one or more programs that the user can access. In an exemplary embodiment of the present invention, the user access the program 'DRGUBSEM'. Upon clicking on the listed program the user views the web page 300B. Further, the web page 300B may include multiple navigation buttons that may allow the user to check the information associated with the program. The information may include, without any limitation, profile, previous versions, activity log, linked programs, program structure, and effort estimation. The other navigation buttons like 'Planning', 'Tracking, Documents', 'Administration', and 'Reports' may also get displayed on the web page 300B.

Figure 4:
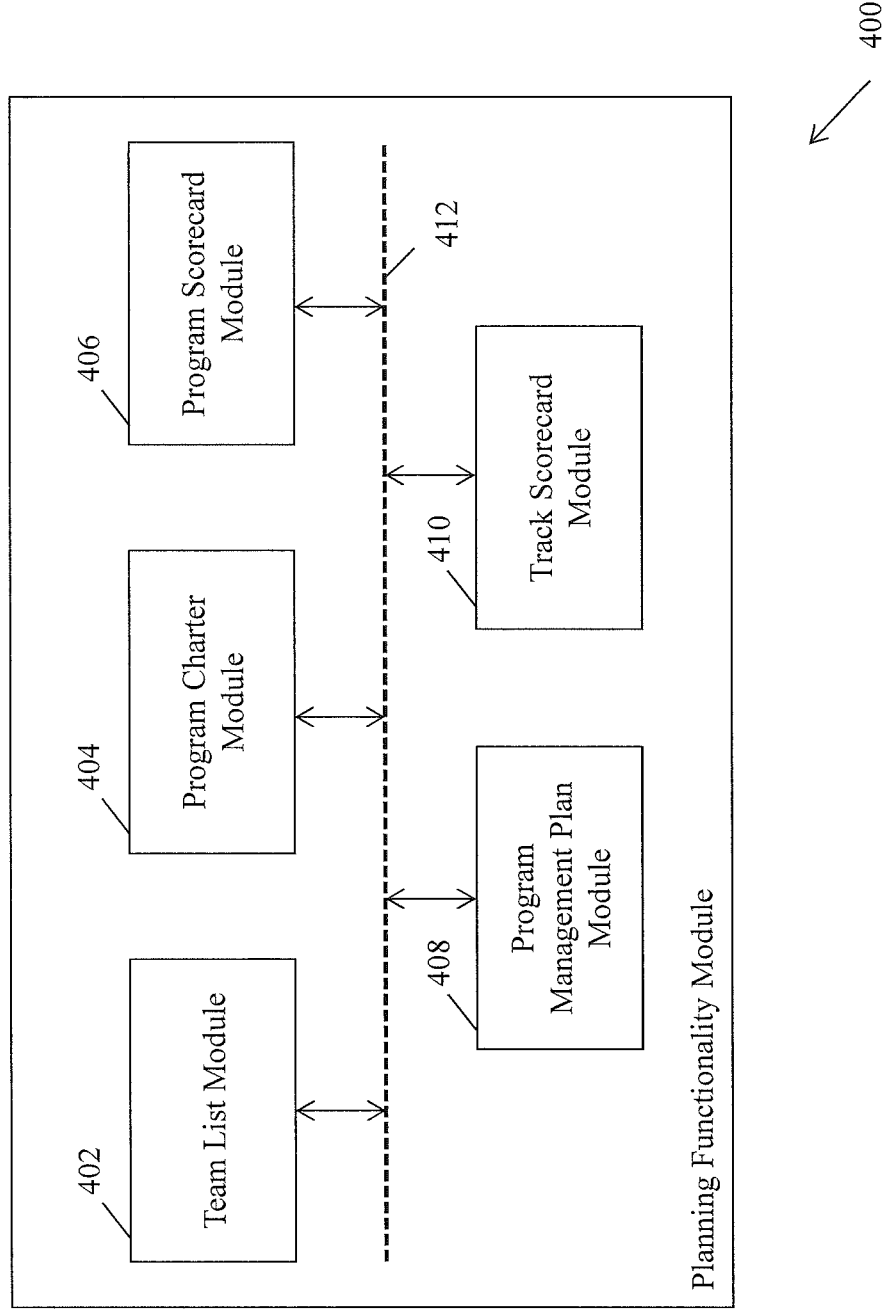
FIG. 4 is a detailed block diagram of a planning functionality module in accordance with an embodiment of the present invention.

FIG. 4 is a detailed block diagram of a planning functionality module in accordance with an embodiment of the present invention. The planning functionality module 400 may be hardware or software or hardware with embedded software or a firmware that is configured to facilitate planning of the one or more programs and comprises a team list module 402, a program charter module 404, a program score card module 406, a program management plan module 408, and a track scorecard module 410. The team list module 402, the program charter module 404, the program score card module 406, the program management plan module 408, and the track scorecard module 410 are communicatively coupled to each other through a central repository 412. In various embodiments of the present invention, the team list module 402 may be hardware or software or hardware with embedded software or a firmware that is configured to facilitate planning of team members and their associated roles for the one or more programs being managed. The team list module 402 may list the names of the people in the team and their corresponding roles in the one or more programs. For example, the roles may include a project manager, a quality analyst, a senior quality analyst and the like. In various embodiments of the present invention, the program charter module 404 may be hardware or software or hardware with embedded software or a firmware that is configured to facilitate planning of scope, phases, milestones, success factors, and risks associated with the one or more programs being managed. In various embodiments of the present invention, the program scorecard module 406 may be hardware or software or hardware with embedded software or a firmware that is configured to facilitate analysis of business objectives associated with the one or more programs being managed. The program scorecard module 406 is further configured to facilitate mapping of business objectives to objectives of the one or more programs being managed. In an exemplary embodiment of the present invention, the business objectives are aligned to larger enterprise vision for initiating the one or more programs. The program objectives are aligned to the scope of the one or more programs that are set as a boundary to operate. TABLE 2 and TABLE 3 depict exemplary business objectives and program objectives in banking domain.

TABLE 2

| Program Name | Business Objectives |
| --- | --- |
| Corporate E-banking | Enable Corporative E-banking by Mid of April 2012 |
| Retail Banking Implementation | Implementing Retail banking solution by Q1 2013 |
| Corporate Banking Implementation | Implementing Corporate banking solution by Q4 2013 |

TABLE 3

| Business Objective | Program Objective |
| --- | --- |
| Enable Corporative E-banking | The objective of this Release is to enable Corporate E-banking for the bank by Mid of April 2012 |
| Implement Retail banking | The objective of this Release is to enable Retail banking for the bank through the program version 10.4 with customization |
| Implement Corporate Banking | The objective of this Release is to enable Corporate banking for the bank using version 11.0 of the program |

In various embodiments of the present invention, the program management plan module 408 may be hardware or software or hardware with embedded software or a firmware that is configured to facilitate generation of a quality plan, a staffing plan, a training plan, a risk management plan, a communication plan, and an infrastructure plan for the one or more programs being managed. The program management plan module 408 is further configured to generate estimates and methodology for the one or more programs for achieving plurality of objectives associated with the one or more programs.

In various embodiments of the present invention, the track scorecard module 410 may be hardware or software or hardware with embedded software or a firmware that is configured to facilitate analysis of goals and strategic objectives associated with the one or more tracks being managed. The track scorecard module 410 is further configured to facilitate generation of a list of goals under a predefined track. TABLE 4 illustrates exemplary parameters associated with the one or more programs and the corresponding goals.

TABLE 4

| Parameter | Formula to calculate | Goal |
| --- | --- | --- |
| Net Milestone (Overall) Delay | Variance between the actual total project duration at end of project and the estimated total project duration at the end of design stage | 0% |
| Quality of Project | Number of Severity 1 Incidents raised during the Post Implementation Period of the application/Total cost of the project | 1 |
| Program Cost | Variance between Total cost for project vs. project estimation done for feasibility | 5% |
| Training Effectiveness | Avg. Feedback score on a scale of 0~10 | 8.5 |

The planning functionality module 400 is further configured to include a workflow component to capture artifacts, associated with the one or more programs, from a submitter of the program to a reviewer of the program and then to an approver of the program. In an exemplary embodiment of the present invention, the submitter may be the program manager, the reviewer may be a member of the PMO and the approver may be a member of a steering committee associated with the one or more programs. Further, in various exemplary embodiments of the present invention, for all the key work products within a program like program charter, program scorecard, program management plan, track scorecard and track plan the roles of submitter, reviewer and approver may have a unique responsibility. The submitter may be responsible for filling in the required details and route the details to the reviewer. The reviewer may then check the contents, adds review comments as applicable and routes to the approver. The approver may then raise a rejection for any further work by the submitter. The approver may also do a sanity check of the contents, adds comments, and may then routes to baseline work product/rejects for further work by the submitter.

Figure 5:
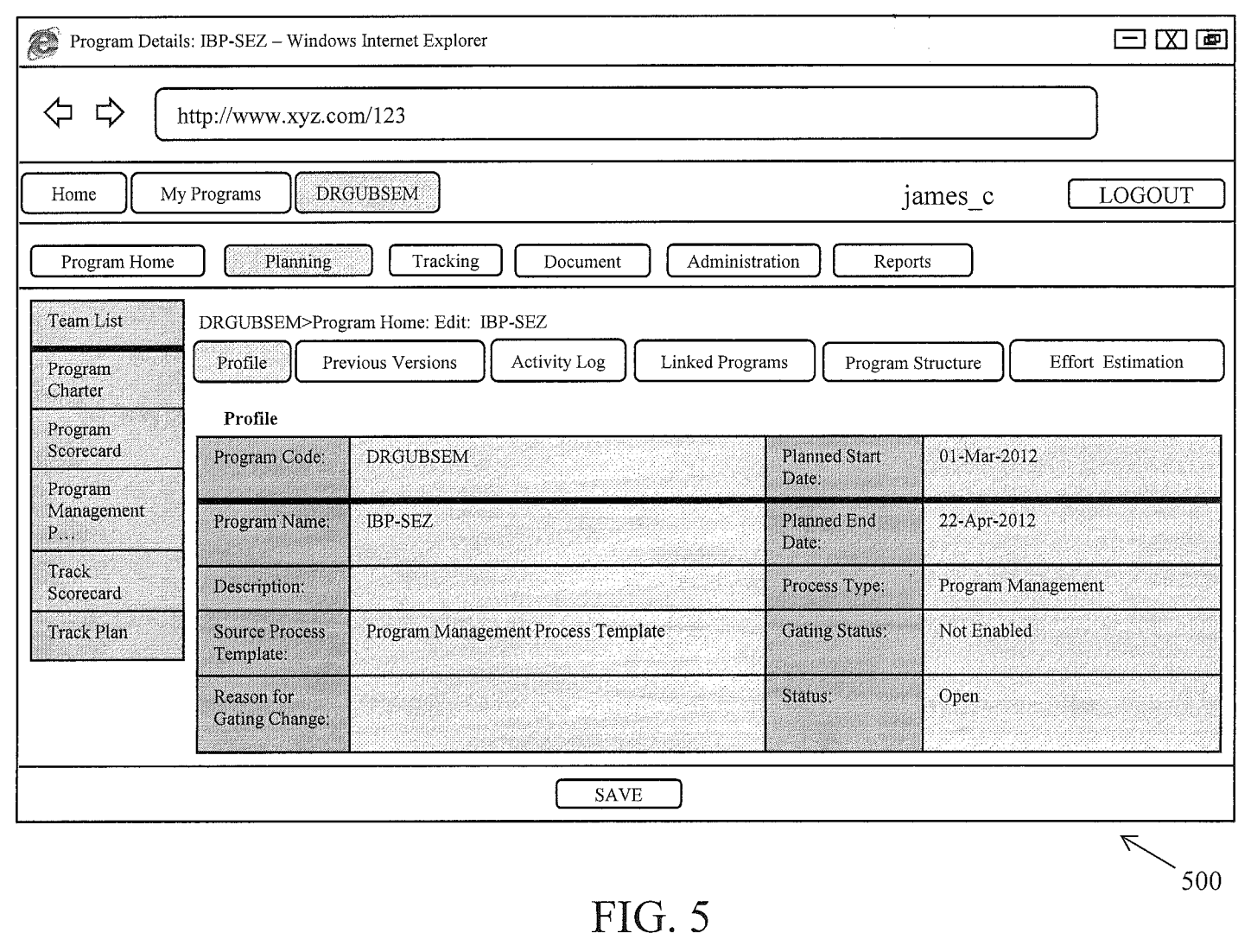

Further, in various embodiments of the present invention, the modules 402, 404, 406, 408, and 410 facilitate rendering of web pages on the one or more user terminals. FIG. 5 depicts an exemplary web page rendered by the planning functionality module in accordance with an embodiment of the present invention. In an embodiment of the present invention, the user can access the web page 500 by clicking on the planning navigation button as depicted in web page 300B. Upon clicking on the planning button the user may view other navigation buttons including, without any limitation, 'Team List', 'Program Charter', 'Program Scorecard', 'Program Management Plan', 'Track Scorecard', and 'Track Plan'.

Figure 6:
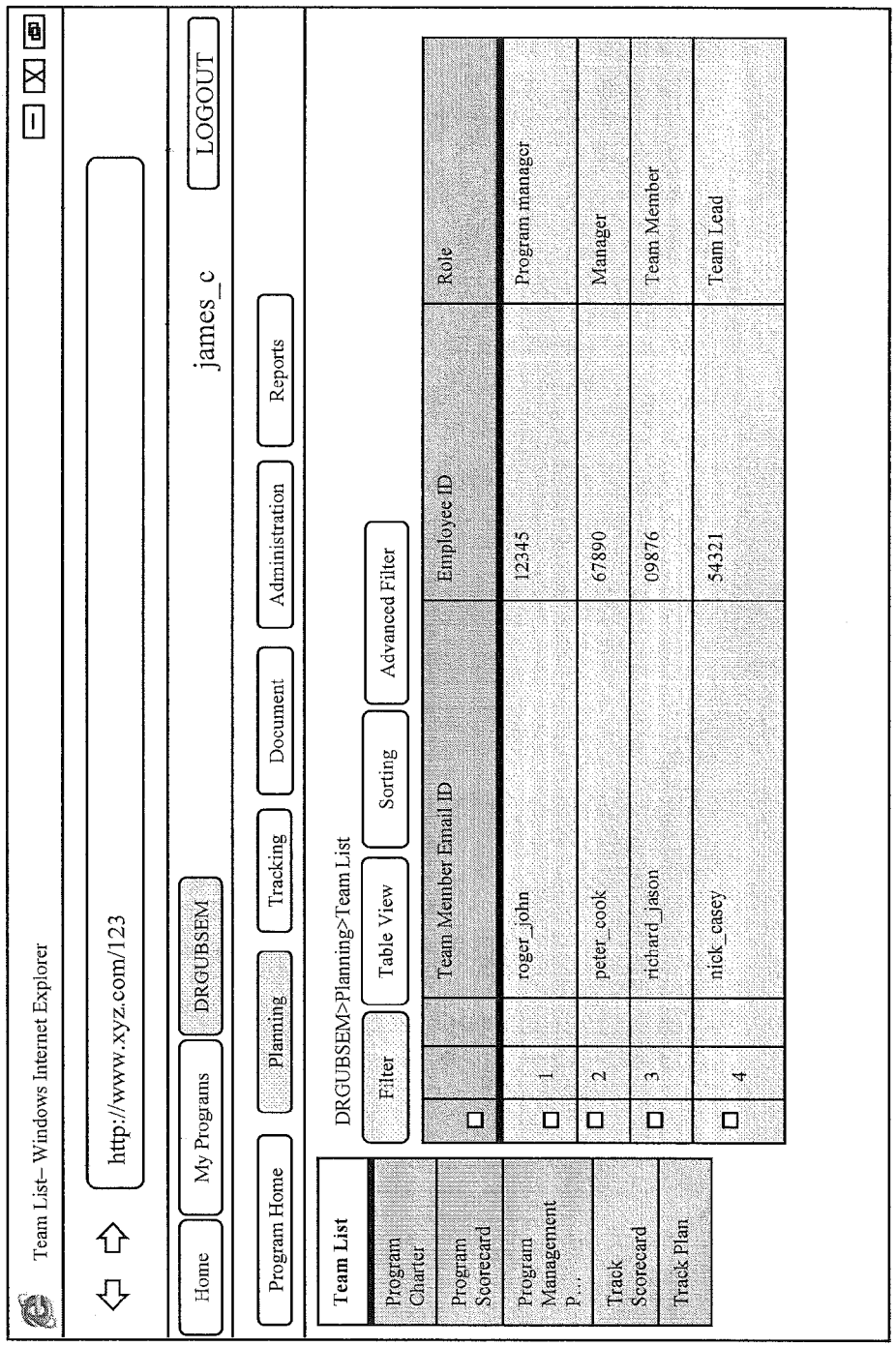
FIG. 6 depicts an exemplary web page rendered by a team list module in accordance with an embodiment of the present invention.
Figure 7A:
Figure 7I:
Figure 7K:

FIG. 6 depicts an exemplary web page rendered by the team list module in accordance with an embodiment of the present invention. Upon clicking the team list navigation button, the user may access list of the team members involved in the program.

FIGS. 7A-7L depict exemplary web pages rendered by the program charter module in accordance with various embodiments of the present invention. In an embodiment of the present invention, when the user clicks on the 'Program Charter' navigation button (hereinafter interchangeably referred to as button) as shown in FIG. 6, the user may view multiple navigation buttons as illustrated in the FIG. 7A. In an embodiment of the present invention, the multiple navigation buttons may include, without limitations, 'Program Details', 'Business Context', 'Program Scope', 'Assumptions', 'Business Objectives', 'Program Phases', 'Program High Level Milestones', 'Critical Success Factors', 'Top Risks', 'Program Organization', 'Comments', 'Workflow', 'Previous Versions', 'Activity Log' and 'Attachments'. When the user clicks on the 'Programs Details' button, the user can view the details of the program as depicted in web page 700A. The details of the program may include, without limitations, 'Program Code', 'Program Start Date', 'Program End Date', 'Program Manager', 'Program Sponsor', 'Business Process', and 'Strategic Objective'. The web page 700B comprises the business plan areas or strategic opportunities and is generated by clicking on the 'Business Context' button. The business context comprises goals, strategies and objectives associated with the program.

The web page 700C is generated when the user clicks on the 'Program Scope' button as depicted in the web page 700A. The program scope covers scope of the program with respect to boundaries of business process targeted for functioning of the program. The web page 700C further includes other buttons related to the program scope like 'Details', 'Traceability', 'Comments', 'Previous Versions', 'Activity Log', and 'Attachments'. Web page 700D depicts the program phase functionality and facilitates multiple phases of the program. In an embodiment of the present invention, a phase in a program is a milestone that is agreed upon with the client. The duration and deliverables, acceptance criteria, etc., are discussed and agreed upon by the IT organization and the client. In an example for implementation of SAP system for supply chain division of the client, the phase I may relate Pre Sales, Phase II may relate to Sales, and Phase III may relate to Post Sales. Further, each phase may in turn have multiple tracks like Implementation, Testing, Organizational change management, and Business process support.

The Program High Level milestones may be viewed and edited using the web page 700E. The web page 700E facilitates a program manager to add multiple milestones within the program duration. The 'Critical Success Factors' web page 700F allows a user to view and process critical success factors within the program. To add risks associated with the program the user may use the web page 700G that can be viewed by clicking 'Top Risks' button. The web page 700H is viewed by clicking the button 'Program Organization' and may be used by the user to view how the program is organized. The web page 700I is viewed by clicking the button 'Comments' and allows the user to log the comments associated with the program. Upon clicking the 'Workflow' button, the user may view the web page 700J. The web page 700J displays the work flow details for an item. In an embodiment of the present invention, the submitter of the program submits the program artifacts like a program charter or a program plan or program scorecard for review. The reviewer then reviews the program artifacts through the web page 700J and then forwards the program artifacts to the approver for his/her final approval and baseline. The web page 700K is generated by clicking on the 'Previous Version' button and provides previous versions of the Program Management Charter in read only mode. In an embodiment of the present invention, a version of the program may be created when an item in the program is base lined. Once the item has been base lined it may be re-opened so that the user may modify the item for next cycle or whenever required. The previously base lined version for the item in such a case would be accessible through web page 700K in read-only mode. The web page 700L is displayed by clicking on the 'Activity Log' button and it displays an audit trail for an item.

FIG. 8 depicts an exemplary web page rendered by the program scorecard module in accordance with an embodiment of the present invention. The web page 800 includes multiple buttons including, without any limitation, 'Program Details', 'Program Goals', 'Comments', 'Workflow', 'Previous Versions', 'Activity Log', and 'Attachments'. Clicking on the 'Program Details' button would display the details of the program. The 'Program Goals' button allows a program manager to add goals to the program. The program manager may modify and delete the goals if the scorecard is with submitter of the program. In an embodiment of the present invention, the 'Program Goals' button may facilitate viewing of the strategic objectives and execution effectiveness of the program. The web page 800 may be used to update the strategic objectives associated with the program. The 'Workflow' button facilitates display of work flow details for an item. In an embodiment of the present invention, when the submitter of the program submits the program the program is reviewed by selected members and is then given an approval. Once the approver routes, the program scorecard is base-lined. In an embodiment of the present invention, the program submitter can re-open the base-lined scorecard for modifications. The 'Previous Versions' button provides access to the user to all the previous versions of the scorecard in read only mode. In an embodiment of the present invention, a version is created when an item is base-lined, by routing it through all the applicable stages in the workflow for the item. Once the item has been base-lined it can be re-opened so that the user can modify it for next cycle or whenever required. The previously base-lined version for the item in such a case is accessible through previous version section in read-only mode. With the 'Activity Log' button the user may view the audit trail of an item. The 'Attachments' button allows the user to upload documents related to the scorecard. In an embodiment of the present invention, the documents may be uploaded to the central repository 114.

Figure 9A:
Figure 9B:
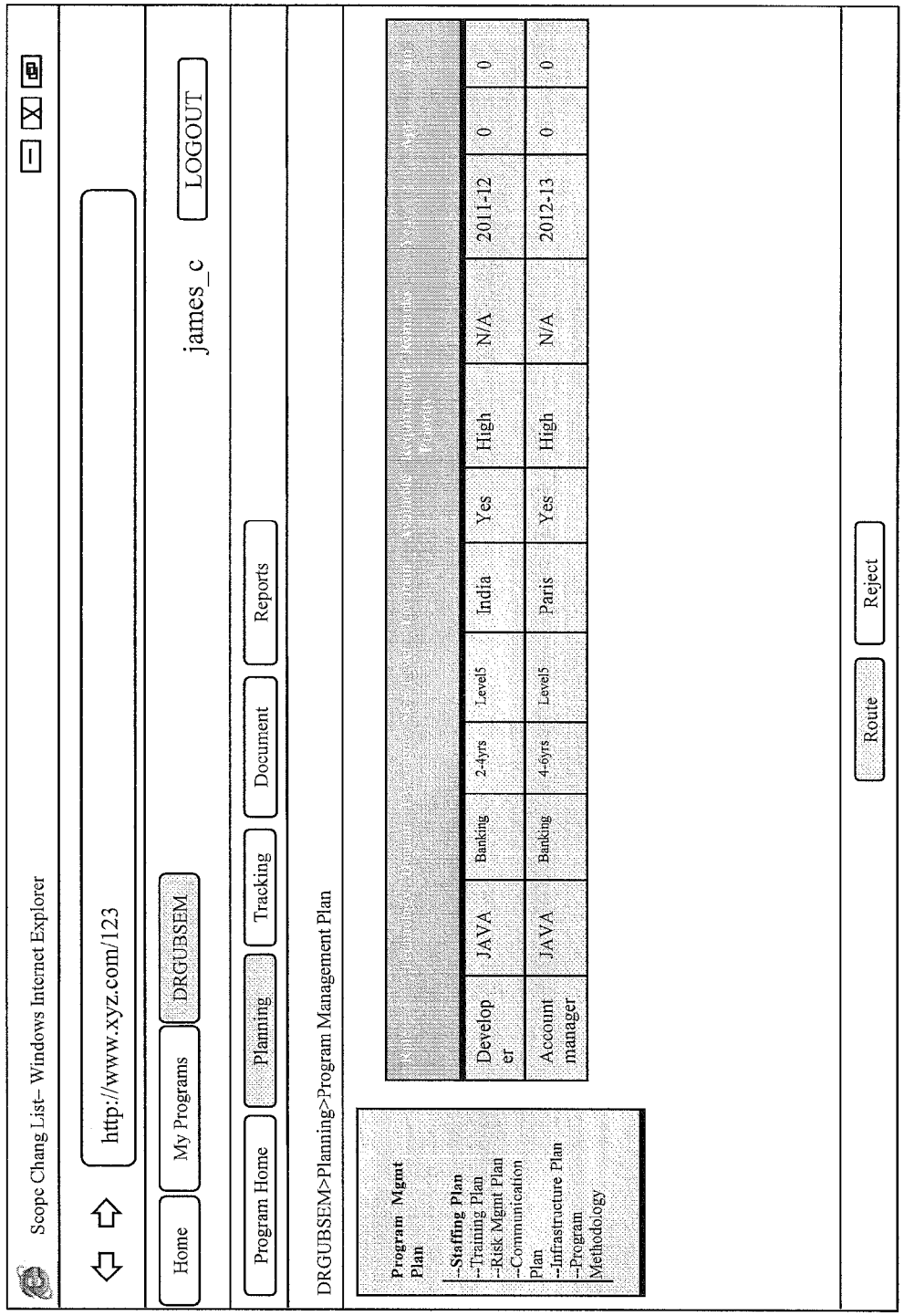
Figure 9C:
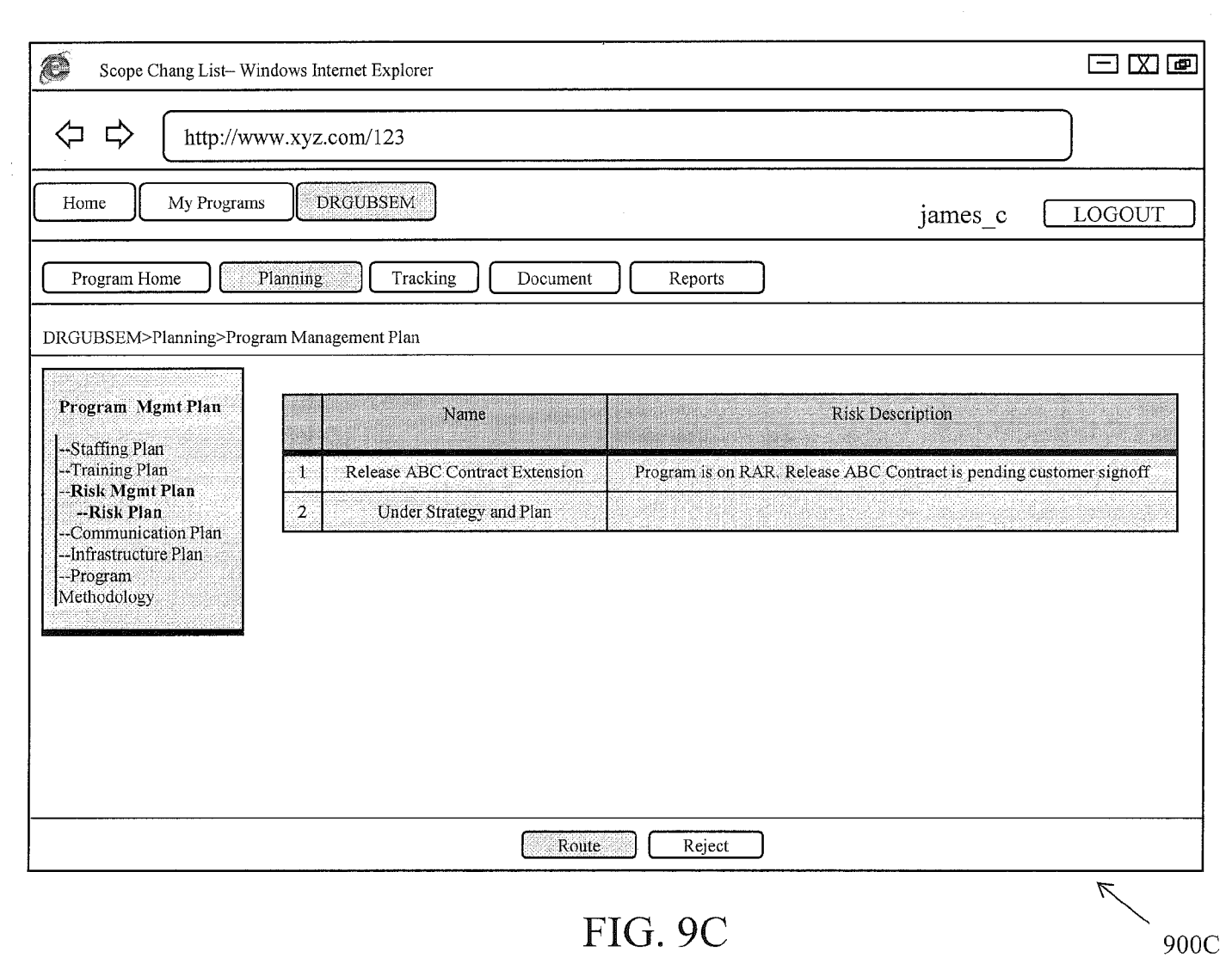
Figure 9D:
Figure 9E:
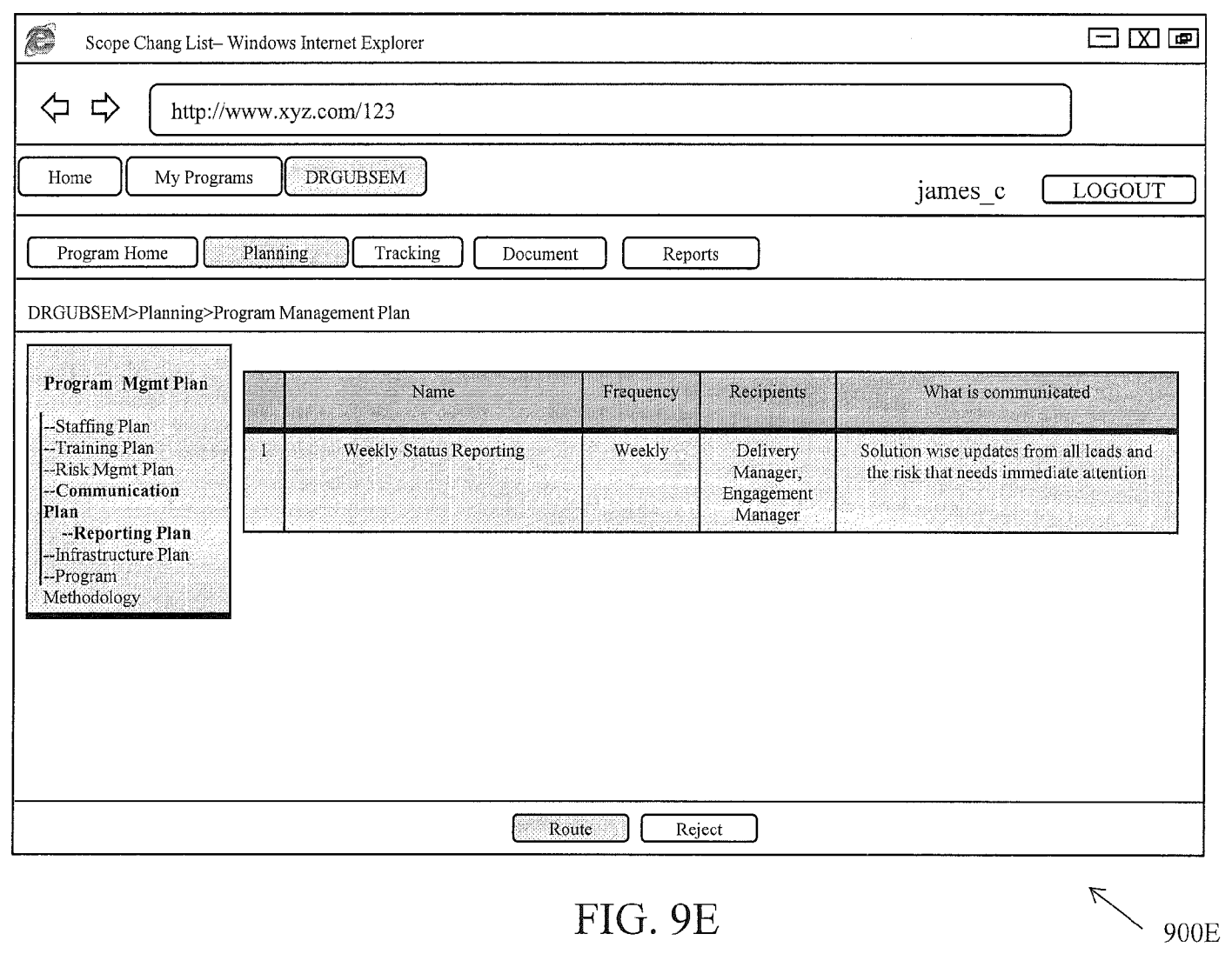
Figure 9F:
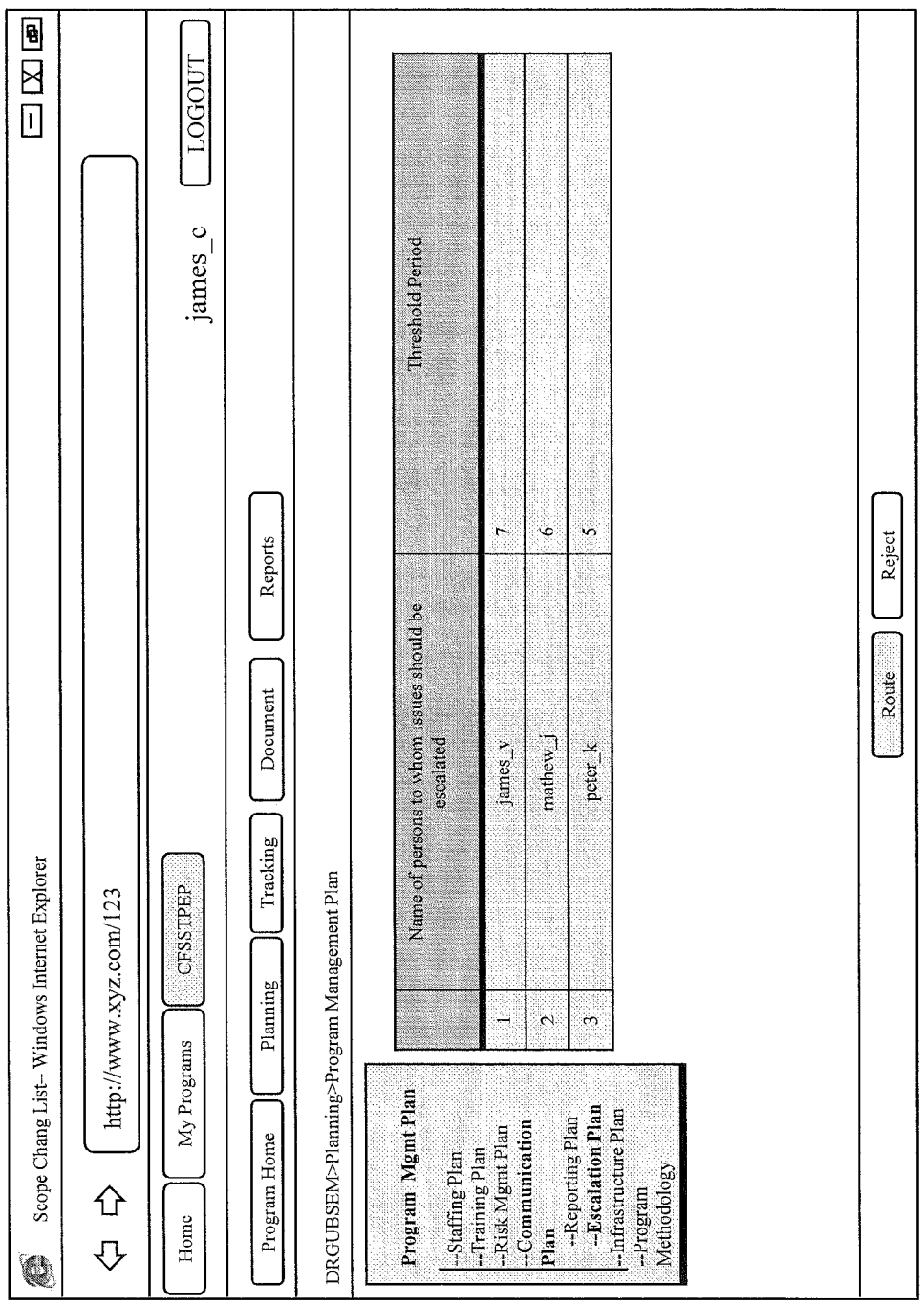

FIGS. 9A-9G depict exemplary web pages rendered by the program management plan module in accordance with various embodiments of the present invention. In an embodiment of the present invention, the user may use the web page 900 to generate, without limitations, quality plan, staffing plan, training plan, risk management plan, communication plan, and infrastructure plan. The user may also generate estimates and methodology for the program for achieving plurality of objectives associated with the program. In order to generate the quality, staffing, training, risk management, communication, and infrastructure plans, estimates and methodologies, the user may use multiple buttons provided by the web page 900 including, without any limitation, 'Program Profile', 'Project Scope', 'Process Plan', 'Process Estimates', 'Quality Plan', 'Staffing Plan', 'Training Plan', 'Risk Management Plan', 'Communication Plan', and 'Infrastructure Plan'. FIG. 9B illustrates an exemplary web page 900B generated upon clicking the button 'Staffing Plan'. The button 'Staffing Plan' may be used for resource planning for the program. FIG. 9C illustrates an exemplary web page 900C generated upon clicking the button 'Risk Management Plan'. The risk management may facilitate identification of risk associated with the program and its key attributes. The risk management may further facilitate assignment of the risk to the owners and may also track the risk till its closure. The web page 900D may be generated upon clicking on a risk 'Release ABC Contract Extension'. The web page 900E is generated upon clicking on the button 'Communication Plan'. The web page 900E facilitates listing down different reporting mechanisms established for the program. The web page 900F facilitates listing down different escalation mechanisms established for the program. Further, the web page 900G gets generated upon clicking on the button 'Infrastructure Plan'. The web page 900G facilitates planning of hardware, software and other infrastructure needed for the program.

Figure 10:
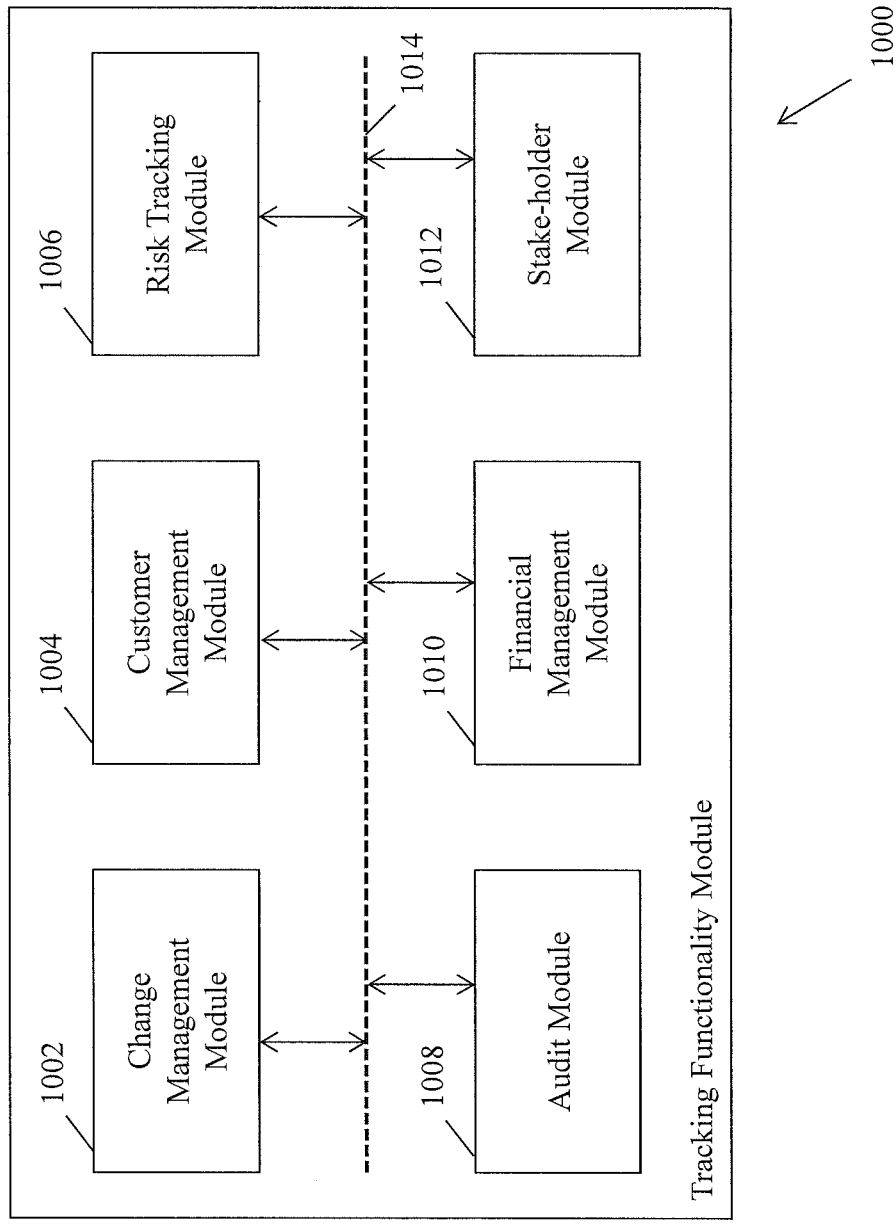
FIG. 10 is a detailed block diagram of a tracking functionality module in accordance with an embodiment of the present invention.
Figure 13:
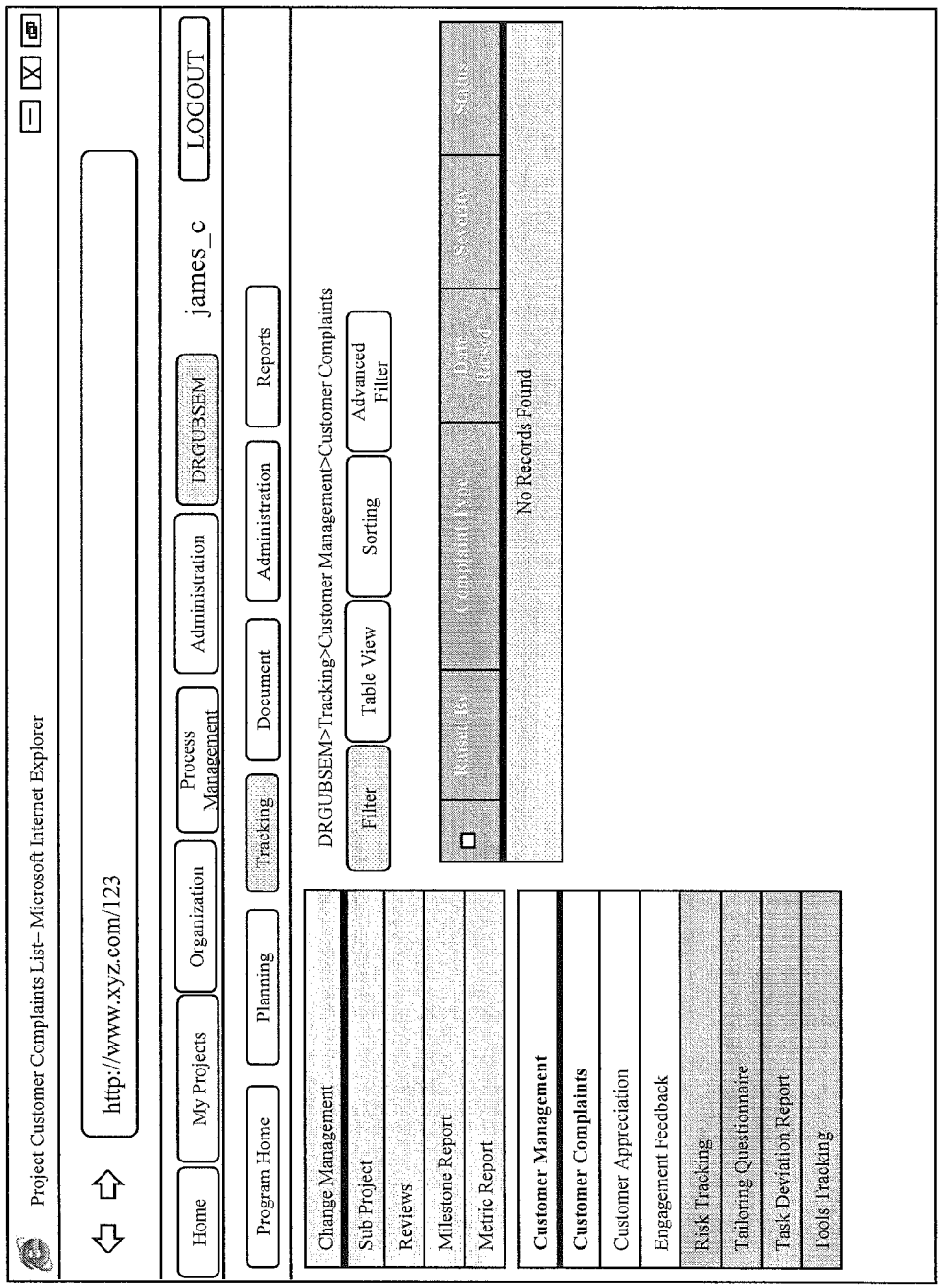
Figure 14:
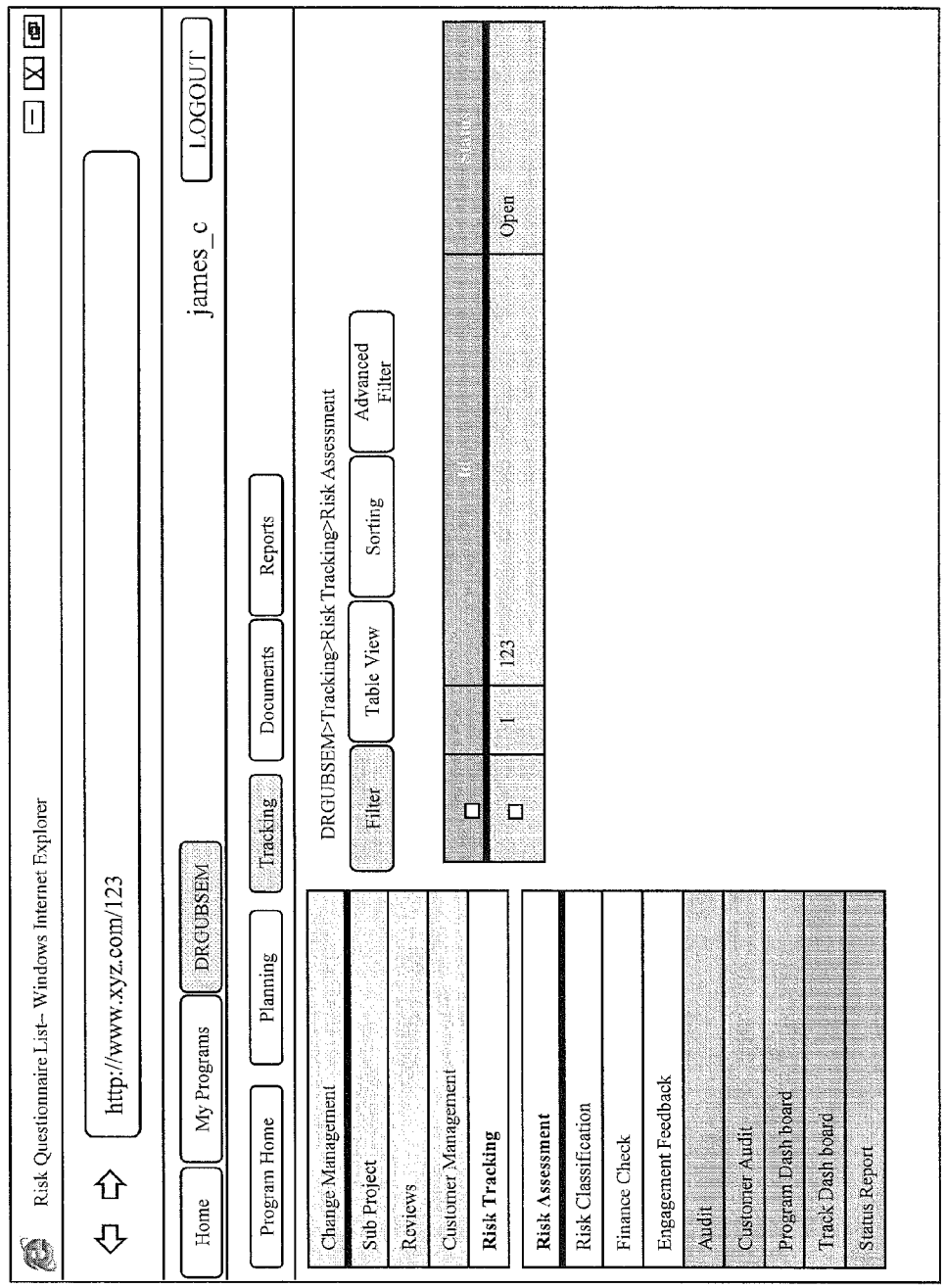
Figure 17:
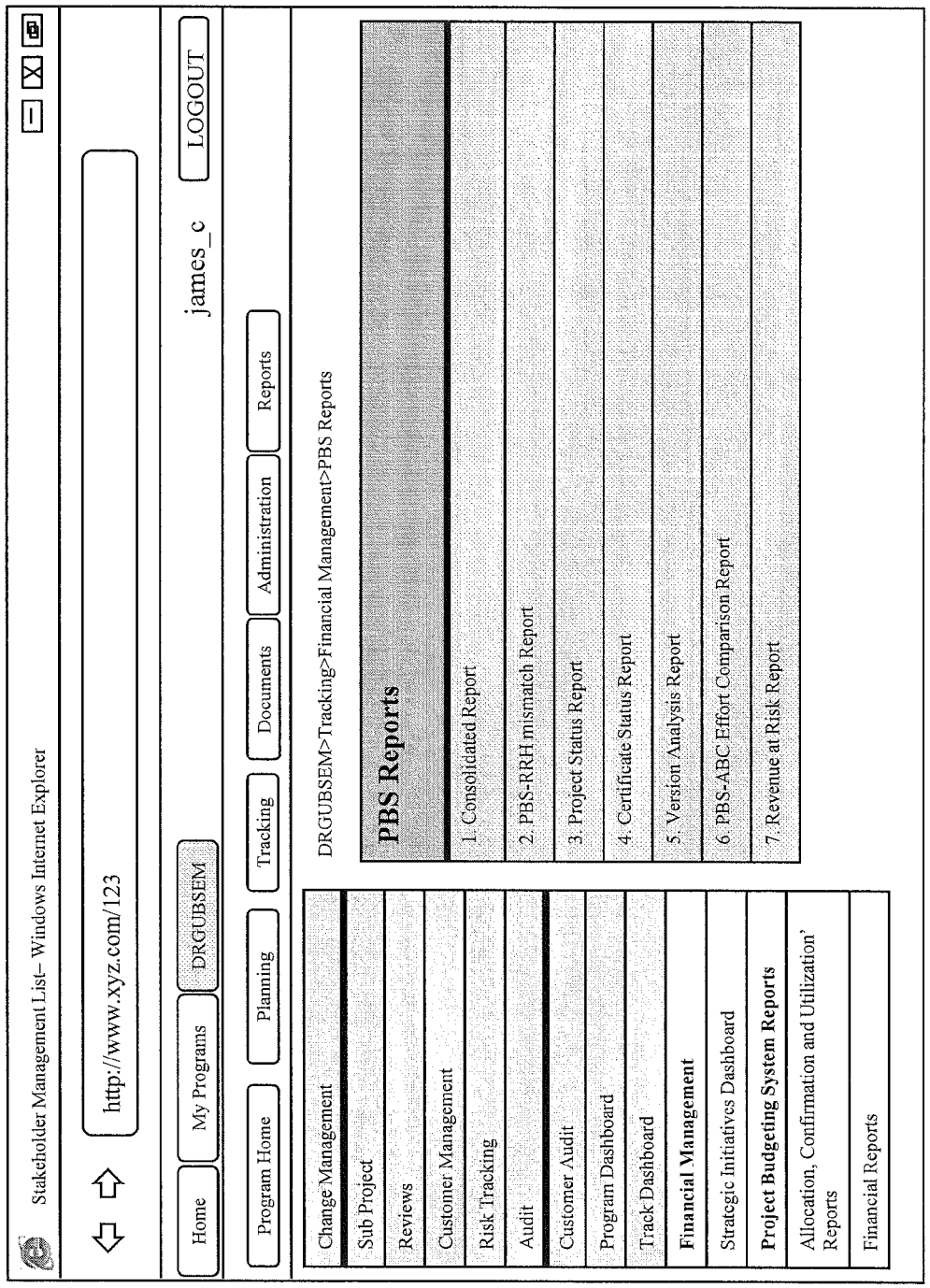
Figure 18:
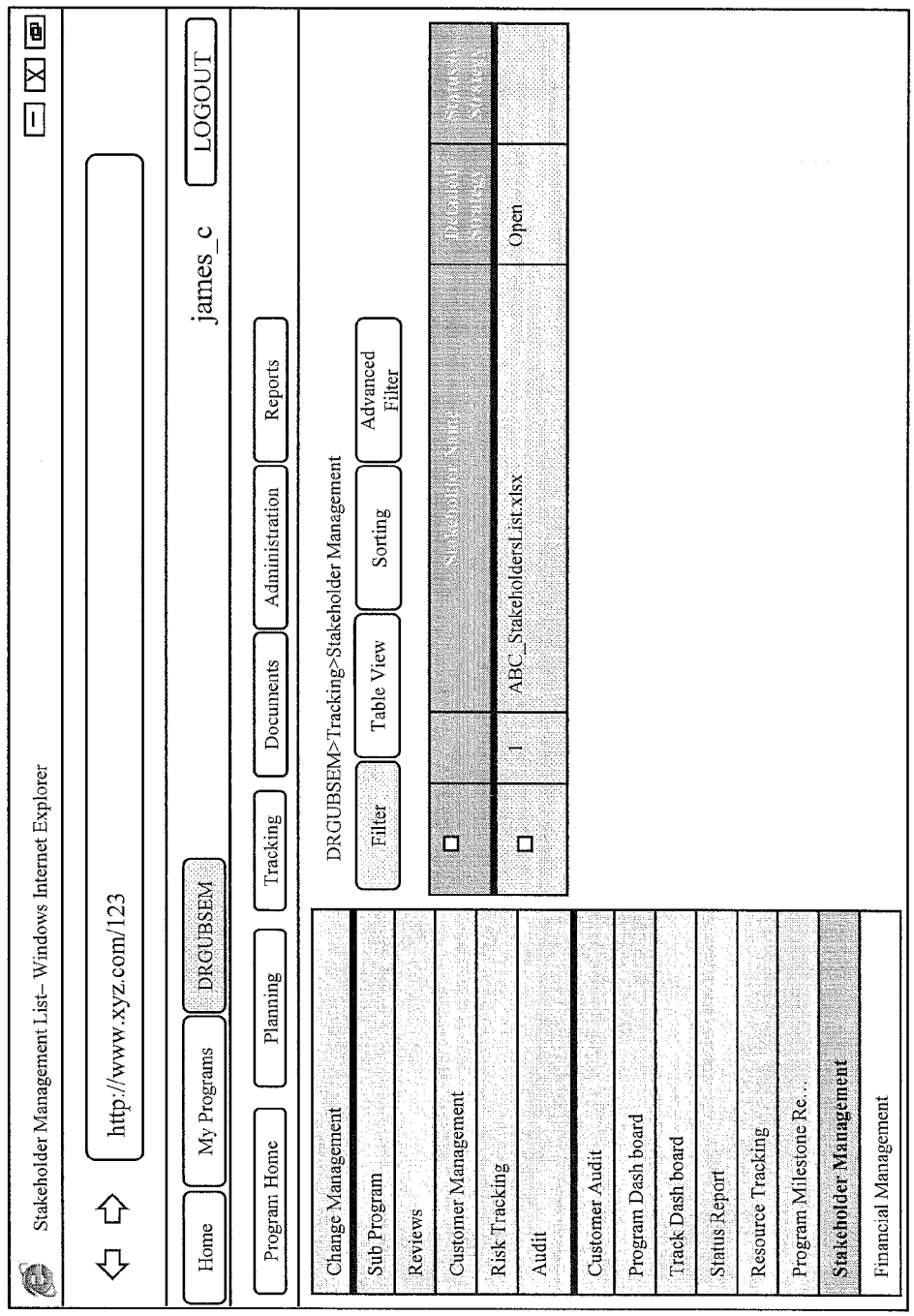
Figure 19C:
Figure 19D:

FIG. 10 is a detailed block diagram of a tracking functionality module in accordance with an embodiment of the present invention. In an embodiment of the present invention, the tracking functionality module includes, without any limitation, a change management module 1002, a customer management module 1004, a risk tracking module 1006, an audit module 1008, a financial management module 1010, and a stake holder module 1012 each communicatively coupled to each other through a central repository 1014. The change management module 1002 may be hardware or software or hardware with embedded software or a firmware that is configured to facilitate creation of a mechanism for managing a change in scope of the one or more programs being managed. The change management module 1002 may also facilitate other functionalities for listing standard issues of the program, action items of the program, and meeting minutes to set up a meeting which lists the time of meeting, its participants and agenda. The customer management module 1004 may be hardware or software or hardware with embedded software or a firmware that is configured to facilitate analysis of complaints, feedback, and appreciation from a customer associated with the one or more programs being managed. In an embodiment of the present invention, the customer may share the feedback by filling a defined feedback form and sending the form to an engagement team associated with the program. In another embodiment of the present invention, the customer may share the feedback by logging an appreciation or a complaint either by an email or verbal expression to the organization associated with the program. The risk tracking module 1006 may be hardware or software or hardware with embedded software or a firmware that is configured to facilitate analysis of the risks associated with the one or more programs being managed. The analysis of the risks may include risks profiling and risks classification. The audit module 1008 may be hardware or software or hardware with embedded software or a firmware that is configured to have a track dashboard component and a program dashboard component. The track dashboard component lists all assumptions planned for the one or more projects that are mapped to the one or more tracks. In an embodiment of the present invention, the listed assumptions and deliverables are marked by the track lead. In an exemplary embodiment of the present invention, the track dashboard lists the relevant project related data under the tracks including, without any limitation, 'Project Risks', 'Project Goals', 'Action Items', 'Change Requests', 'Critical Issues' and Customer complaints that have a probability of greater than or equal to 0.7 or an impact of greater than or equal to 7. The program dashboard component lists all the assumptions planned for the one or more tracks that are mapped to the one or more programs. The program dashboard further lists all the goals planned for a track mapped to the program. In an embodiment of the present invention, the listed assumptions and deliverables are marked by the program manager. The financial management module 1010 may be hardware or software or hardware with embedded software or a firmware that is configured to define procedures for monitoring financial information of the one or more programs being managed to attain a plurality of strategic objectives associated with the one or more programs being managed. The stake-holder management module 1012 may be hardware or software or hardware with embedded software or a firmware that is configured to facilitate identification and management of interests of one or more stakeholders associated with the one or more programs being managed. In an embodiment of the present invention each of the modules (1002, 1004, 1006, 1008, 1010, and 1012) of the tracking functionality module 1000 facilitates rendering of web pages on the one or more user terminals.

FIGS. 11-18 depict exemplary web pages rendered by the tracking functionality module in accordance with an embodiment of the present invention. The web page 1100 is generated when the user clicks on the 'Change Management' button. The web page 1100 may comprise plurality of buttons including, without limitations, 'Change Management', 'Sub Program', 'Reviews', 'Milestone Report', 'Metric Report', 'Customer Management', 'Risk Tracking', 'Tailoring Questionnaire', 'Task Deviation Report', 'Tools Tracking', 'Customer Audit', 'Financial Management', 'Program Dashboard', 'Track Dash board', and 'Stake Holder Management'. Further, the web page 1100 may facilitate change in the scope associated with the program. In an embodiment of the present invention, the web page 1100 may have a write access to a change manager and the program manager and may have a read only access to all the team members. The 'Change Management' button further comprises sub buttons like 'Standard Issues', 'Change Requests', 'Action Items' and 'Meeting Modules'. In an embodiment of the present invention, the web page 1200 may have a write access to a change manager and the program manager and may have a read only access to all the team members. Upon clicking on the customer management button, the customer management module 1004 renders the web page 1300. The 'Customer Management' button further includes sub buttons like 'Customer Complaints', 'Customer Appreciation', and 'Engagement Feedback'. In an embodiment of the present invention, the web page 1300 may have a write access to the program manager and may have a read only access to all the team members. The risk tracking module 1006 renders the web page 1400 that includes sub buttons 'Risk Classification' and 'Finance Check'. In an embodiment of the present invention, the web page 1400 may have a write access to the program manager and a program risk manager. Further, the web page may have a read only access to all the team members. The risk classification may be accessible to only a Senior Quality Analyst, a Quality Manager and a Group Quality Manager. Web page 1500 is rendered by the audit module 1008 when the user clicks on the 'Track Dashboard' button. The 'Track Dashboard' button further comprises plurality of sub buttons, without any limitation, 'Overview', 'Risks', 'Goals', 'Critical Issues', 'Change Requests', 'Action Items', 'Customer Complaints', 'Engagement Feedback', 'Track Feedback', 'Comments' and 'Attachments'. In an embodiment of the present invention, the web page 1500 may have a write access to the program manager and read only access to all team members. The web page 1600 displays the program dashboard that includes plurality of sub buttons including, without limitations, 'Program Mapping Details', 'Risks', 'Goals', 'Comments', and 'Attachments'. In an embodiment of the present invention, the web page 1600 may have a read only access to all team members. The web page 1700 is rendered by the financial management module 1010 when the clicks on the financial management button. The web page 1700 displays plurality of sub buttons including, without limitations, 'Strategic Initiatives Dashboard', 'Project Budgeting System Reports', 'Allocation, Confirmation and Utilization' Reports, and 'Financial Reports'. In an embodiment of the present invention, the web page 1700 may have a write access to the program manager and read only access to all team members. The web page 1800 is rendered by the stakeholder module 1012 when the user clicks on the 'Stake-Holder Management' button. In an embodiment of the present invention, the web page 1800 may have a write access to the program manager and read only access to all team members.

FIGS. 19A-19D depict exemplary web pages rendered by the reporting functionality module in accordance with various embodiments of the present invention. In an embodiment, reporting functionality module 214 may be hardware or software or hardware with embedded software or a firmware that is configured to facilitate generation of reports comprising a status report, a program charter report, a program management plan report, and a track status report as shown from FIGS. 19A-19D. The generation of the reports is facilitated using the data associated with the one or more programs in the central repository 114. Further, the generated reports are stored in the central repository 114. In an embodiment of the present invention, the reports may be accessed by program managers only. The web page 1900A facilitates generating a program status report. In embodiments of the present invention, as depicted in the web page 1900A, the program status report for any predefined two dates may facilitate data for, without any limitation, 'Program Status', 'Program Summary', 'Deliverables and Milestones', 'Critical Risks', 'Critical Issues', 'Scope Changes', 'Consolidated Track Status', and 'Remarks'.

The web page 1900B facilitates generating a program charter report. In various embodiments of the present invention, as depicted in the web page 1900B, for a given version number the program charter report may facilitate data for, without any limitation, 'Program Details', 'Business Context', 'Program Scope', 'Assumptions', 'Business Objectives', 'Program Phases', 'Program High Level Milestones', 'Critical Success factors', 'Top Risks', 'Program Organization', and 'Comment'.

The web page 1900C facilitates generating a program management plan report. In various embodiments of the present invention, for a given version number the program management plan report may facilitate data for, without any limitation, 'Overview', 'Contacts', 'Vendor details', 'Stakeholder matrix', 'Program scope', 'Charter information', 'Map objectives to projects', 'Milestones', 'Deliverables', 'Assumptions', 'Critical 'Success factors', 'Phases', 'Scope change Management', 'Overall estimates', 'Measurement plan', 'Strategic objectives', 'Execution effectiveness', 'Strategies', 'Roles and Responsibilities', 'External Dependency', 'Internal Dependency', 'Capacity Plan', 'Training Plan', 'Risk Plan', 'Reporting Plan', 'Escalation Plan', 'Computer Resources', 'Program Governance Approach', 'Audit Mechanism', 'KM Plan', and 'Comments'.

The web page 1900D facilitates generating a track status report. In various embodiments of the present invention, as depicted in the web page 1900D, between two given dates and a track code the track status report may facilitate data for, without any limitation, 'Track Status Report', 'Track Summary', 'Deliverables and Milestones', 'Critical Risks', 'Critical Issues', and 'Remarks'.

Figure 20:
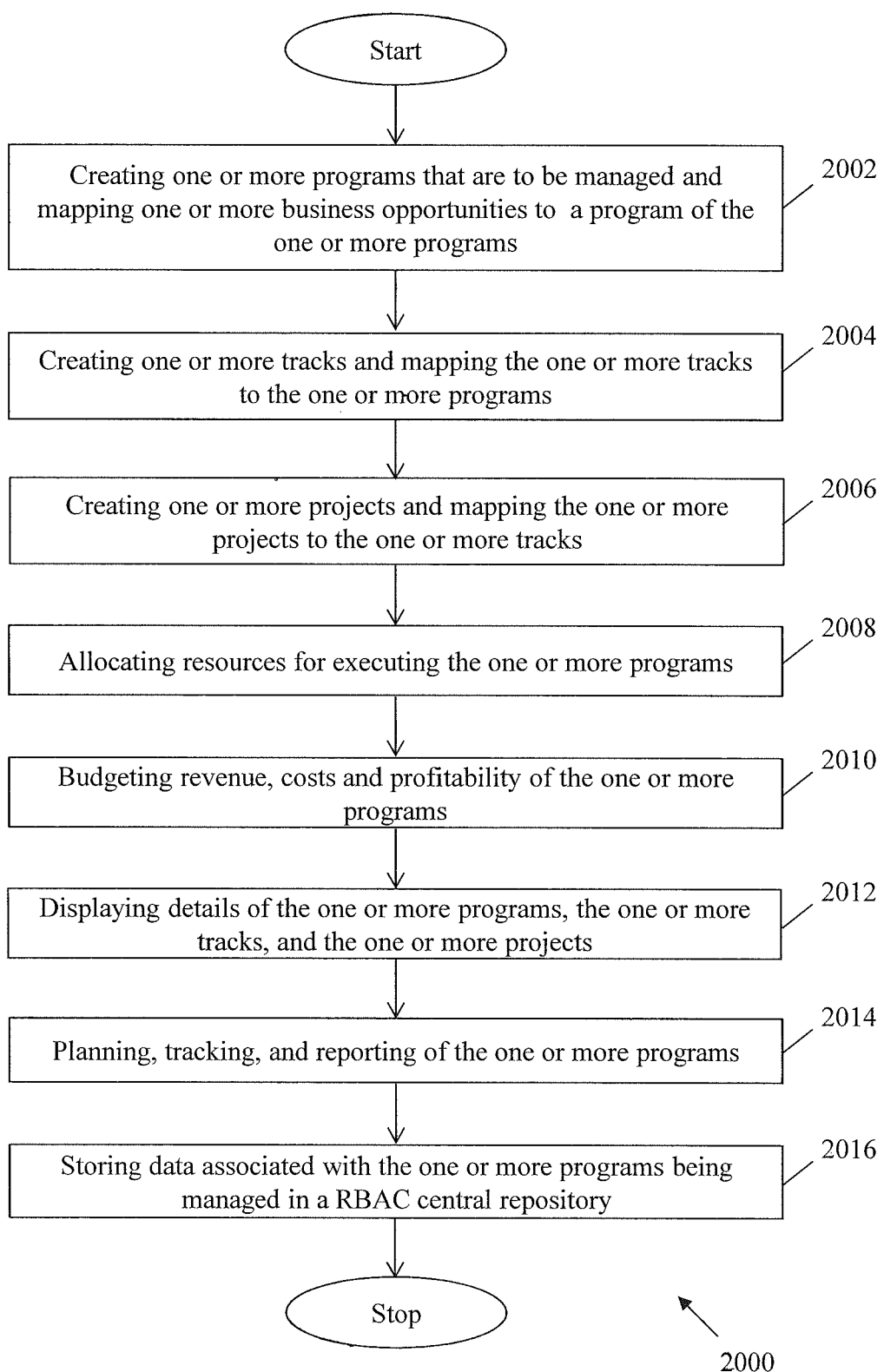
FIG. 20 is a flowchart illustrating a method for facilitating management of one or more programs throughout their lifecycle in an organization in accordance with an embodiment of the present invention.

FIG. 20 is a flowchart illustrating a method for facilitating management of one or more programs throughout their lifecycle in an organization in accordance with an embodiment of the present invention. The method initiates at step 2002 with creation of one or more programs that are to be managed and mapping of one or more business opportunities to a program of the one or more programs.

At step 2004, one or more tracks are created and are mapped to the one or more programs. In an embodiment of the present invention, a track is a subset of a program and each program of the one or more programs comprises the one or more tracks.

At step 2006, one or more projects are created and mapped to the one or more tracks. In an embodiment of the present invention, a project is a subset of the track and each track of the one or more tracks comprises the one or more projects.

At step 2008, resources are allocated for executing the one or more programs. In an embodiment of the present invention, the resources may be human resources.

At step 2010, budgeting of revenue, costs and profitability of the one or more programs is performed.

At step 2012, details of the one or more programs, the one or more tracks, and the one or more projects are displayed to one or more authorized users on one or more user terminals. In an embodiment of the present invention, the details are displayed in form of web pages.

At step 2014, the method 2000 plans, tracks, and reports the one or more programs. In an embodiment of the present invention, the step of planning of the one or more programs further comprises: planning of team members and their associated roles for the one or more programs being managed; planning of scope, phases, milestones, success factors, and risks associated with the one or more programs being managed; analyzing business objectives associated with the one or more programs being managed and mapping of business objectives to objectives of the one or more programs being managed; generating a quality plan, a staffing plan, a training plan, a risk management plan, a communication plan, and an infrastructure plan for the one or more programs being managed; and analyzing goals and strategic objectives associated with the one or more tracks being managed and generating a list of goals under a predefined track. The method 2000 further comprises capturing artifacts, associated with the one or more programs, from a submitter of the one or more programs to a reviewer of the one or more programs and then to an approver of the one or more programs.

In an embodiment of the present invention, the step of tracking the one or more programs further comprises: creating a mechanism for managing a change in scope of the one or more programs being managed; analyzing complaints, feedback, and appreciation from a customer associated with the one or more programs being managed; analyzing risks associated with the one or more programs being managed; listing assumptions planned for the one or more projects that are mapped to the one or more tracks; listing assumptions planned for the one or more tracks that are mapped to the one or more programs; defining procedures for monitoring financial information of the one or more programs being managed to attain a plurality of strategic objectives associated with the one or more programs being managed; and identifying and managing interests of one or more stakeholders associated with the one or more programs being managed.

In an embodiment of the present invention, the method 2000 further comprises setting up of risks, goals, and objectives associated with the one or more programs. In an embodiment of the present invention, the method 2000 further rolls up the risks, goals, and objectives from the one or more projects to the one or more tracks and from the one or more tracks to the one or more programs. In another embodiment of the present invention, the method 2000 further rolls down the risks, goals, and objectives from the one or more programs to the one or more tracks and from the one or more tracks to the one or more projects.

In an embodiment of the present invention, the step of reporting of the one or more programs further comprises generation of reports comprising a status report, a program charter report, a program management plan report, and a track status report.

At step 2016, data associated with the one or more programs being managed in a RBAC central repository. In an embodiment of the present invention, the generation of the reports is facilitated using the data associated with the one or more programs in the central repository. Further, the generated reports are stored in the central repository.

In an embodiment of the present invention, the method 2000 may be embodied in the form of the computer system. The computer system may be similar to as disclosed in conjunction with FIG. 1.

In another embodiment of the present invention, a method for facilitating management of one or more programs throughout their lifecycle in an organization is provided. The method comprises creating one or more programs that are to be managed and mapping one or more business opportunities to a program of the one or more programs. The method further comprises creating one or more tracks and mapping the one or more tracks to the one or more programs, wherein a track is a subset of a program and each program of the one or more programs comprises the one or more tracks. The method further comprises creating one or more projects and mapping the one or more projects to the one or more tracks, wherein a project is a subset of the track and each track of the one or more tracks comprises the one or more projects. The method further comprise allocating resources for executing the one or more programs, the one or more tracks, and the one or more projects. The method further comprises budgeting revenue, costs and profitability of the one or more programs, the one or more tracks, and the one or more projects.

The method further comprises displaying details of the one or more programs, the one or more tracks, and the one or more projects to one or more authorized users on one or more user terminals. The details are displayed in the form of web pages. The method further comprises planning, tracking, and reporting of the one or more programs. In an embodiment of the present invention, the method further comprises setting up of risks, goals, and objectives associated with the one or more programs. In an embodiment of the present invention, the method further rolls up the risks, goals, and objectives from the one or more projects to the one or more tracks and from the one or more tracks to the one or more programs. In another embodiment of the present invention, the method further rolls down the risks, goals, and objectives from the one or more programs to the one or more tracks and from the one or more tracks to the one or more projects. The method further comprises sharing of data associated with the one or more programs, the one or more tracks and the one or more projects, between the one or more user terminals.

The method further comprises storing data associated with the one or more programs being managed in a RBAC central repository.

In various embodiments, the present invention may be embodied in a computer program product for facilitating program management in an organization. The computer program product comprises a non-transitory computer-readable medium having computer-readable program code stored thereon, the computer-readable program code comprising instructions that when executed by a processor, cause the processor to: create one or more programs that are to be managed and to map one or more business opportunities to a program of the one or more programs. The processor further creates one or more tracks and maps the one or more tracks to the one or more programs. In an embodiment of the present invention, a track is a subset of a program and each program of the one or more programs comprises the one or more tracks. The processor further creates one or more projects and maps the one or more projects to the one or more tracks. In an embodiment of the present invention, a project is a subset of the track and each track of the one or more tracks comprises the one or more projects. The processor further allocates resources for executing the one or more programs. The processor further budgets revenue, costs and profitability of the program.

The processor further displays details of the one or more programs, the one or more tracks, and the one or more projects to one or more authorized users on one or more user terminals. The details are displayed in form of web pages. The processor further plans, tracks, and reports the one or more programs. In an embodiment of the present invention, the step of planning of the one or more programs further comprises: planning of team members and their associated roles for the one or more programs being managed; planning of scope, phases, milestones, success factors, and risks associated with the one or more programs being managed; analyzing business objectives associated with the one or more programs being managed and mapping of business objectives to objectives of the one or more programs being managed; generating a quality plan, a staffing plan, a training plan, a risk management plan, a communication plan, and an infrastructure plan for the one or more programs being managed; and analyzing goals and strategic objectives associated with the one or more tracks being managed and generating of a list of goals under a predefined track. The processor further captures artifacts, associated with the one or more programs, from a submitter of the one or more programs to a reviewer of the one or more programs and then to an approver of the one or more programs.

In an embodiment of the present invention, the step of tracking the one or more programs further comprises: creating a mechanism for managing a change in scope of the one or more programs being managed; analyzing complaints, feedback, and appreciation from a customer associated with the one or more programs being managed; analyzing risks associated with the one or more programs being managed; listing assumptions planned for the one or more projects that are mapped to the one or more tracks; listing assumptions planned for the one or more tracks that are mapped to the one or more programs; defining procedures for monitoring financial information of the one or more programs being managed to attain a plurality of strategic objectives associated with the one or more programs being managed; and identifying and managing interests of one or more stakeholders associated with the one or more programs being managed.

In an embodiment of the present invention, the processor further sets up of risks, goals, and objectives associated with the one or more programs. In an embodiment of the present invention, the processor further rolls up the risks, goals, and objectives from the one or more projects to the one or more tracks and from the one or more tracks to the one or more programs. In another embodiment of the present invention, the processor further rolls down the risks, goals, and objectives from the one or more programs to the one or more tracks and from the one or more tracks to the one or more projects.

In an embodiment of the present invention, the step of reporting of the one or more programs further comprises generation of reports comprising a status report, a program charter report, a program management plan report, and a track status report. The processor further stores data associated with the one or more programs being managed in a RBAC central repository. In an embodiment of the present invention, the generation of the reports is facilitated using the data associated with the one or more programs in the central repository. Further, the generated reports are stored in the central repository.

In yet another embodiment of the present invention, a computer program product for facilitating program management in an organization is provided. The computer program product comprises a non-transitory computer-readable medium having computer-readable program code stored thereon, the computer-readable program code comprising instructions that when executed by a processor, cause the processor to: create one or more programs that are to be managed and to map one or more business opportunities to a program of the one or more programs. The processor further creates one or more tracks and maps the one or more tracks to the one or more programs. In an embodiment of the present invention, a track is a subset of a program and each program of the one or more programs comprises the one or more tracks. The processor further creates one or more projects and maps the one or more projects to the one or more tracks. In an embodiment of the present invention, a project is a subset of the track and each track of the one or more tracks comprises the one or more projects. The processor further allocates resources for executing the one or more programs, the one or more tracks and the one or more projects. The processor further budgets revenue, costs and profitability of the one or more programs, the one or more tracks and the one or more projects.

The processor further displays details of the one or more programs, the one or more tracks and the one or more projects, the one or more tracks, and the one or more projects to one or more authorized users on one or more user terminals. The details are displayed in form of web pages. The processor further plans, tracks, and reports the one or more programs, the one or more tracks and the one or more projects.

In an embodiment of the present invention, the processor further sets up of risks, goals, and objectives associated with the one or more programs, the one or more tracks and the one or more projects. In an embodiment of the present invention, the processor further rolls up the risks, goals, and objectives from the one or more projects to the one or more tracks and from the one or more tracks to the one or more programs. In another embodiment of the present invention, the processor further rolls down the risks, goals, and objectives from the one or more programs to the one or more tracks and from the one or more tracks to the one or more projects. The processor further shares data associated with the one or more programs, the one or more tracks and the one or more projects, the one or more tracks and the one or more projects, between the one or more user terminals. The processor further stores data associated with the one or more programs, the one or more tracks and the one or more projects being managed in a RBAC central repository.

While the exemplary embodiments of the present invention are described and illustrated herein, it will be appreciated that they are merely illustrative. It will be understood by those skilled in the art that various changes in form and detail may be made therein without departing from or offending the spirit and scope of the present invention.

The invention claimed is:

1. A computer system for facilitating management of one or more programs throughout their lifecycle in an organization, the computer system comprising a microprocessor and a memory, the computer system further comprising:

a Customer Relationship Management (CRM) module configured to facilitate, using the microprocessor, creation of one or more programs that are to be managed, the CRM module further configured to map one or more business opportunities to a program of the one or more programs;

an Order Management System (OMS) module configured to facilitate, using the microprocessor, creation of one or more tracks and to map the one or more tracks to the one or more programs, wherein a track is a subset of a program and each program of the one or more programs comprises the one or more tracks;

a program management module configured to facilitate, using the microprocessor, creation of one or more projects and map the one or more projects to the one or more tracks, wherein a project is a subset of the track and each track of the one or more tracks comprises the one or more projects;

a resource allocation module configured to facilitate, using the microprocessor, allocation of resources for executing the one or more programs;

a finance budgeting module configured to facilitate, using the microprocessor, budgeting of revenue, costs and profitability of the one or more programs;

a Software as a Service (SaaS) based program module configured to:

render, using the microprocessor, one or more web pages on one or more user terminals, the one or more web pages display details of the one or more programs, the one or more tracks, and the one or more projects to one or more authorized users on one or more user terminals, wherein the one or more user terminals are communicatively coupled to the SaaS based program module; and facilitate planning, tracking, and reporting of the one or more programs using the one or more rendered web pages; and facilitate access to different versions of a program selected from the one or more programs, wherein the access to different versions of the selected program is facilitated using a navigation button; and a central repository communicatively coupled to the SaaS based program module, wherein the central repository is Role Based Access Controlled (RBAC) and is configured to store data associated with the one or more programs, the one or more tracks, and the one or more projects being managed by the SaaS based program module.

2. The computer system of claim 1 further comprising evaluating and approving the one or more programs, wherein the one or more programs are approved by one or more stakeholders associated with the one or more programs.

3. The computer system of claim 1, wherein the SaaS based program module is further configured to facilitate setting up of risks, goals, and objectives associated with the one or more programs.

4. The computer system of claim 3, wherein the SaaS based program module is further configured to:
roll up the risks, goals, and objectives from the one or more projects to the one or more tracks and from the one or more tracks to the one or more programs; and
roll down the risks, goals, and objectives from the one or more programs to the one or more tracks and from the one or more tracks to the one or more projects.

5. The computer system of claim 1, wherein the SaaS based program module facilitates planning of the one or more programs using a planning functionality module, the planning functionality module further comprising:
a team list module configured to facilitate planning of team members and their associated roles for the one or more programs being managed;
a program charter module, wherein the program charter module is configured to facilitate planning of scope, phases, milestones, success factors, and risks associated with the one or more programs being managed;
a program scorecard module, wherein the program scorecard module is configured to facilitate analysis of business objectives associated with the one or more programs being managed, the program scorecard module further configured to facilitate mapping of business objectives to objectives of the one or more programs being managed;
a program management plan module, wherein the program management plan module is configured to facilitate generation of a quality plan, a staffing plan, a training plan, a risk management plan, a communication plan, and an infrastructure plan for the one or more programs being managed; and
a track scorecard module, wherein the track scorecard module is configured to facilitate analysis of goals and strategic objectives associated with the one or more tracks being managed, the track scorecard module further configured to facilitate generation of a list of goals under a predefined track.

6. The computer system of claim 5, wherein the planning functionality module further comprises a workflow component to capture artifacts, associated with the one or more programs, from a submitter of the one or more programs to a reviewer of the one or more programs and then to an approver of the one or more programs.

7. The computer system of claim 1, wherein the SaaS based program module facilitates tracking of the one or more programs using a tracking functionality module, the tracking functionality module further comprising:
a change management module configured to facilitate creation of a mechanism for managing a change in scope of the one or more programs being managed;
a customer management module configured to facilitate analysis of complaints, feedback, and appreciation from a customer associated with the one or more programs being managed;
a risk tracking module configured to facilitate analysis of risks associated with the one or more programs being managed;
an audit module, wherein the audit module further comprises:
a track dashboard component to list assumptions planned for the one or more projects that are mapped to the one or more tracks; and
a program dashboard component to list assumptions planned for the one or more tracks that are mapped to the one or more programs;
a financial management module configured to facilitate defining procedures for monitoring financial information of the one or more programs being managed to attain a plurality of strategic objectives associated with the one or more programs being managed; and
a stake-holder management module configured to facilitate identification and management of interests of one or more stakeholders associated with the one or more programs being managed.

8. The computer system of claim 1, wherein the SaaS based program module facilitates reporting of the one or more programs using a report generating functionality module, the report generating functionality module is configured to facilitate generation of reports comprising a status report, a program charter report, a program management plan report, and a track status report, further wherein the generation of the reports is facilitated using the data associated with the one or more programs in the central repository, further wherein the generated reports are stored in the central repository.

9. A computer system for facilitating management of one or more programs throughout their lifecycle in an organization, the computer system comprising a microprocessor and a memory, the computer system further comprising:
a Customer Relationship Management (CRM) module configured to facilitate, using the microprocessor, creation of one or more programs that are to be managed, the CRM module further configured to map one or more business opportunities to a program of the one or more programs;
an Order Management System (OMS) module configured to facilitate, using the microprocessor, creation of one or more tracks and to map the one or more tracks to the one or more programs, wherein a track is a subset of a program and each program of the one or more programs comprises the one or more tracks;
a program management module configured to facilitate, using the microprocessor, creation of one or more projects and map the one or more projects to the one or more tracks, wherein a project is a subset of the track and each track of the one or more tracks comprises the one or more projects;

a resource allocation module configured to facilitate, using the microprocessor, allocation of resources for executing the one or more programs, the one or more tracks, and the one or more projects;
a finance budgeting module configured to facilitate, using the microprocessor, budgeting of revenue, costs and profitability of the one or more programs, the one or more tracks, and the one or more projects;
a Software as a Service (SaaS) based program module configured to:
   render, using the microprocessor, one or more web pages on one or more user terminals, the one or more web pages display details of the one or more programs, the one or more tracks, and the one or more projects to one or more authorized users on one or more user terminals, wherein the one or more user terminals are communicatively coupled to the SaaS based program module;
   facilitate planning, tracking, and reporting of the one or more programs, the one or more tracks and the one or more projects using the one or more rendered web pages;
   facilitate access to different versions of a program selected from the one or more programs, wherein the access to different versions of the selected program is facilitated using a navigation button;
   facilitate setting up of risks, goals, and objectives associated with the one or more programs, the one or more tracks and the one or more projects using the one or more rendered web pages, the SaaS based program module is further configured to:
      roll up the risks, goals, and objectives from the one or more projects to the one or more tracks and from the one or more tracks to the one or more programs; and
      roll down the risks, goals, and objectives from the one or more programs to the one or more tracks and from the one or more tracks to the one or more projects; and
   facilitate, using the one or more rendered web pages, sharing of data associated with the one or more programs, the one or more tracks, and the one or more projects, between the one or more user terminals;
a central repository communicatively coupled to the program module, wherein the central repository is Role Based Access Controlled (RBAC) and is configured to store the data associated with the one or more programs, the one or more tracks, and the one or more projects being managed by the SaaS based program module.

10. A microprocessor implemented method for facilitating management of one or more programs throughout their lifecycle in an organization, the computer implemented method comprising:
   creating, using a microprocessor, one or more programs that are to be managed and mapping one or more business opportunities to a program of the one or more programs;
   creating, using the microprocessor, one or more tracks and mapping the one or more tracks to the one or more programs, wherein a track is a subset of a program and each program of the one or more programs comprises the one or more tracks;
   creating, using the microprocessor, one or more projects and mapping the one or more projects to the one or more tracks, wherein a project is a subset of the track and each track of the one or more tracks comprises the one or more projects;
   allocating, using the microprocessor, resources for executing the one or more programs;
   budgeting, using the microprocessor, revenue, costs and profitability of the one or more programs;
   rendering, using the microprocessor, one or more web pages on one or more user terminals, the one or more web display details of the one or more programs, the one or more tracks, and the one or more projects to one or more authorized users on one or more user terminals;
   facilitating planning, tracking, and reporting of the one or more programs using the one or more rendered web pages;
   facilitating access to different versions of a program selected from the one or more programs, wherein the access to different versions of the selected program is facilitated using a navigation button; and
   storing, using the microprocessor, data associated with the one or more programs, the one or more tracks, and the one or more projects being managed, using the one or more rendered web pages, in a RBAC central repository.

11. The microprocessor implemented method of claim 10 further comprising evaluating and approving the one or more programs, wherein the one or more programs are approved by one or more stakeholders associated with the one or more programs.

12. The microprocessor implemented method of claim 10 further comprising setting up of risks, goals, and objectives associated with the one or more programs.

13. The microprocessor implemented method of claim 12 further comprising:
   rolling up the risks, goals, and objectives from the one or more projects to the one or more tracks and from the one or more tracks to the one or more programs; and
   rolling down the risks, goals, and objectives from the one or more programs to the one or more tracks and from the one or more tracks to the one or more projects.

14. The microprocessor implemented method of claim 10, wherein the step of planning of the one or more programs further comprises:
   planning of team members and their associated roles for the one or more programs being managed;
   planning of scope, phases, milestones, success factors, and risks associated with the one or more programs being managed;
   analyzing business objectives associated with the one or more programs being managed and mapping of business objectives to objectives of the one or more programs being managed;
   generating a quality plan, a staffing plan, a training plan, a risk management plan, a communication plan, and an infrastructure plan for the one or more programs being managed; and
   analyzing goals and strategic objectives associated with the one or more tracks being managed and generating of a list of goals under a predefined track.

15. The microprocessor implemented method of claim 14 further comprising capturing artifacts, associated with the one or more programs, from a submitter of the one or more programs to a reviewer of the one or more programs and then to an approver of the one or more programs.

16. The microprocessor implemented method of claim 10, wherein the step of tracking the one or more programs further comprises:
   creating a mechanism for managing a change in scope of the one or more programs being managed;

analyzing complaints, feedback, and appreciation from a customer associated with the one or more programs being managed;
analyzing risks associated with the one or more programs being managed;
listing assumptions planned for the one or more projects that are mapped to the one or more tracks;
listing assumptions planned for the one or more tracks that are mapped to the one or more programs;
defining procedures for monitoring financial information of the one or more programs being managed to attain a plurality of strategic objectives associated with the one or more programs being managed; and
identifying and managing interests of one or more stakeholders associated with the one or more programs being managed.

17. The microprocessor implemented method of claim 10, wherein the step of reporting of the one or more programs further comprises generation of reports comprising a status report, a program charter report, a program management plan report, and a track status report, further wherein the generation of the reports is facilitated using the data associated with the one or more programs in the central repository, further wherein the generated reports are stored in the central repository.

18. A microprocessor implemented method for facilitating management of one or more programs throughout their lifecycle in an organization, the computer implemented method comprising:
creating, using a microprocessor, one or more programs that are to be managed and mapping one or more business opportunities to a program of the one or more programs;
creating, using the microprocessor, one or more tracks and mapping the one or more tracks to the one or more programs, wherein a track is a subset of a program and each program of the one or more programs comprises the one or more tracks;
creating, using the microprocessor, one or more projects and mapping the one or more projects to the one or more tracks, wherein a project is a subset of the track and each track of the one or more tracks comprises the one or more projects;
allocating, using the microprocessor, resources for executing the one or more programs, the one or more tracks and the one or more projects;
budgeting, using the microprocessor, revenue, costs and profitability of the one or more programs, the one or more tracks and the one or more projects;
rendering, using the microprocessor, one or more web pages on one or more user terminals, the one or more web display details of the one or more programs, the one or more tracks, and the one or more projects to one or more authorized users on one or more user terminals;
facilitating planning, tracking, and reporting of the one or more programs, the one or more tracks and the one or more projects using the one or more rendered web pages;
facilitating access to different versions of a program selected from the one or more programs, wherein the access to different versions of the selected program is facilitated using a navigation button;
setting up risks, goals, and objectives associated with the one or more programs, the one or more tracks and the one or more projects using the one or more rendered web pages, wherein the step further comprising:
rolling up the risks, goals, and objectives from the one or more projects to the one or more tracks and from the one or more tracks to the one or more programs;
rolling down the risks, goals, and objectives from the one or more programs to the one or more tracks and from the one or more tracks to the one or more projects; and
sharing, using the one or more rendered web pages, data, associated with the one or more programs, the one or more tracks and the one or more projects, between the one or more user terminals; and
storing, using the microprocessor, the data associated with the one or more programs, the one or more tracks and the one or more projects being managed, using the one or more rendered web pages, in a RBAC central repository.

19. A computer program product for facilitating management of one or more programs throughout their lifecycle in an organization, the computer program product comprising:
a non-transitory computer-readable medium having computer-readable program code stored thereon, the computer-readable program code comprising instructions that when executed by a processor, cause the processor to:
create one or more programs that are to be managed and map one or more business opportunities to a program of the one or more programs;
create one or more tracks and mapping the one or more tracks to the one or more programs, wherein a track is a subset of a program and each program of the one or more programs comprises the one or more tracks;
create one or more projects and mapping the one or more projects to the one or more tracks, wherein a project is a subset of the track and each track of the one or more tracks comprises the one or more projects;
allocate resources for executing the one or more programs;
budget revenue, costs and profitability of the one or more programs;
render one or more web pages on one or more user terminals, the one or more web pages display details of the one or more programs, the one or more tracks, and the one or more projects to one or more authorized users on one or more user terminals;
plan, track, and report the one or more programs using the one or more rendered web pages;
facilitate access to different versions of a program selected from the one or more programs, wherein the access to different versions of the selected program is facilitated using a navigation button; and
store data associated with the one or more programs the one or more tracks, and the one or more projects being managed, using the one or more rendered web pages, in a RBAC central repository.

* * * * *